(12) United States Patent
Kaku

(10) Patent No.: US 9,884,572 B2
(45) Date of Patent: Feb. 6, 2018

(54) BRAKING DEVICE

(71) Applicant: TS TECH CO., LTD., Asaka-shi, Saitama (JP)

(72) Inventor: Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 165 days.

(21) Appl. No.: 14/777,978

(22) PCT Filed: Mar. 20, 2014

(86) PCT No.: PCT/JP2014/057723
§ 371 (c)(1),
(2) Date: Sep. 17, 2015

(87) PCT Pub. No.: WO2014/148600
PCT Pub. Date: Sep. 25, 2014

(65) Prior Publication Data
US 2016/0280099 A1 Sep. 29, 2016

(51) Int. Cl.
*B60N 2/16* (2006.01)
*F16D 59/00* (2006.01)
*F16D 65/08* (2006.01)
*F16D 51/12* (2006.01)
*F16D 51/36* (2006.01)
(Continued)

(52) U.S. Cl.
CPC ............ *B60N 2/168* (2013.01); *B60N 2/165* (2013.01); *B60N 2/167* (2013.01); *F16D 51/12* (2013.01); *F16D 51/36* (2013.01); *F16D 59/00* (2013.01); *F16D 65/08* (2013.01); *F16D 65/09* (2013.01); *F16D 65/22* (2013.01); *F16D 2127/004* (2013.01)

(58) Field of Classification Search
CPC .......... F16D 51/36; F16D 51/32; F16D 51/34; F16D 51/42
USPC ....................... 188/78, 79, 323, 324; 192/223
See application file for complete search history.

(56) References Cited

U.S. PATENT DOCUMENTS 1,575,426 A * 3/1926 Harry ..................... F16D 51/60
188/78
6,068,097 A 5/2000 Kurita
(Continued)

FOREIGN PATENT DOCUMENTS

JP H11182587 7/1999
JP 2002-511035 A 4/2002
(Continued)

OTHER PUBLICATIONS

Office Action issued for Japanese Patent Application No. 2013-059897, dated Nov. 8, 2016, 6 pages including English translation.
(Continued)

*Primary Examiner* — Jacob S. Scott
*Assistant Examiner* — Timothy Hannon
(74) *Attorney, Agent, or Firm* — Hamre, Schumann, Mueller & Larson, P.C.

(57) ABSTRACT

A braking device 3 includes an outer race 10, brake cams 20 each having a brake surface 21, and an output-side rotating member 30 disposed radially inward of the brake cams 20. The braking device 3 includes a spring 81 provided between at least one pair of brake cams 20 among three brake cams 20 so as to urge the pair of the brake cams 20 to be separated from each other.

18 Claims, 21 Drawing Sheets

(51) Int. Cl.
    *F16D 65/09*     (2006.01)
    *F16D 65/22*     (2006.01)
    *F16D 127/00*     (2012.01)

(56) References Cited

U.S. PATENT DOCUMENTS

| | | |
|---|---|---|
| 6,206,164 B1 | 3/2001 | Kurita |
| 6,253,894 B1 | 7/2001 | Schumann et al. |
| 8,348,344 B2 | 1/2013 | Richard et al. |
| 2003/0057032 A1* | 3/2003 | Liu .......................... B62L 5/00 |
| | | 188/24.12 |
| 2003/0173182 A1 | 9/2003 | Kim |
| 2006/0278484 A1* | 12/2006 | Antolovic ............... F16D 51/04 |
| | | 188/323 |
| 2010/0219037 A1* | 9/2010 | Cai ........................ B60N 2/168 |
| | | 192/223 |
| 2011/0227386 A1 | 9/2011 | Berndtson et al. |
| 2012/0112508 A1 | 5/2012 | Richard et al. |

FOREIGN PATENT DOCUMENTS

| | | |
|---|---|---|
| JP | 2002-168276 A | 6/2002 |
| JP | 2008-296856 A | 12/2008 |
| JP | 2011-153675 A | 8/2011 |
| JP | 2011219082 | 11/2011 |
| JP | 2012101786 | 5/2012 |

OTHER PUBLICATIONS

International Search Report issued in connection with PCT/JP2014/057723 dated Jun. 16, 2014.

* cited by examiner (a)

(b)

BRAKING DEVICE

TECHNICAL FIELD

The present invention relates to a braking device used, for example, in a height adjustment mechanism for a car seat.

BACKGROUND ART

A braking device is used in a height adjustment mechanism for a car seat; such a braking device may be configured such that an output shaft rotates by the manipulation of a lever that is provided at an input-side and designed to be swung upward or downward but the output shaft does not rotate even when a force for lowering the seat due to weights of the seat and an occupant is applied to the output shaft (see, for example, Japanese Translation of PCT International Application, Publication No. 2002-511035).

This braking device includes an outer race having a cylindrical inner peripheral surface, a plurality of brake cams (clamping members) located opposite the inner peripheral surface, and an output-side rotating member (bolt with a wing) disposed inward of the brake cams. A rotating force imparted to the brake cams is transmitted from the brake cams to the output-side rotating member; however, even though a rotating force is imparted to the output-side rotating member, the brake cams do not rotate because forces applied to the brake cams by the output-side rotating member abutting on the brake cams act mainly as forces for pressing the brake cams against the outer race and the rotating force applied from the output-side rotating member to the brake cams does not overcome the frictional forces which could be generated between the brake cams and the outer race.

SUMMARY OF INVENTION

If the brake cams are assembled inward of the outer race with play, the arrangement of the plurality of brake cams may lose a balance or the brake cams may not closely contact the inner peripheral surface of the outer race, which possibly prevents efficient generation of the braking force.

Further, there has been an increased demand for reducing the size and the weight of the braking device.

A first object of the present invention is to provide a braking device which can generate a braking force efficiently while achieving downsizing and weight reduction. A further object of the present invention is to provide a braking device which is simple in structure.

In the braking device, parts constituting the housing, such as the outer race and the cover member, are generally swaged and fixed together (see, for example, the shapes shown in FIGS. 1 and 8 of Japanese Laid-open Patent Application, Publication No. 2011-153675). However, if the parts constituting the housing are swaged and fixed together, it is necessary to provide a protruding shape for the swaging process and a recess shape for receiving the protrusion, which leads to complicated shapes. Further, the outer race to which a large stress is exerted for generating a braking force is preferably formed as simple as possible in terms of the advantage in strength; this can reduce the weight of the outer race while ensuring the required strength.

A second object of the present invention is to fix the parts constituting the housing together without swaging, so that the shapes of the parts constituting the braking device can be simplified and the reduction of the weight can be achieved.

There are two types of desired structures of the braking device; that is, when a rotating force is applied to the output-side rotating member, rotation of the brake cams in both of one and the other rotational directions (first and second rotational directions) may be desirably inhibited (hereinafter referred to as a "two-way type" in this description), and rotation of the brake cams in one of the two directions may be inhibited (hereinafter referred to as a "one-way type" in this description). It is advantageous in terms of manufacture if both of these structures are achieved in a compact manner with a minimal modification of parts.

A third object of the present invention is to provide a one-way type braking device which can be used as a two-way type braking device with a minimal modification of parts.

A further object of the present invention is to reduce the number of parts and/or to reduce the size and the weight of the device.

The braking device is used in combination with a ratchet device for actuating the braking device as a clutch unit (see, for example, Japanese Laid-open Patent Application, Publication No. 2011-153675).

In this clutch unit, one part disposed in a housing of the ratchet device is restricted to inhibit a rotation of the part relative to the housing. Conventionally, this part is fixed to the housing by welding.

Welding is on one hand efficient, because of its sufficient connection, for fixing at a portion where great strength is required, but on the other hand, is not necessarily preferable for fixing at a portion where great strength is not required. This is, for example, because if a protrusion made by welding (hereinafter referred to as a "weld bead") is formed, it may be necessary to remove the weld bead or to provide sufficient clearance for preventing interference with another part.

A forth object of the present invention is to provide a clutch unit in which unnecessary welding is not employed to enable efficient manufacture. A further object of the present invention is to provide a clutch unit which can generate a sufficient braking force.

In order to solve the above-described first object, a braking device according to the present invention comprises: an outer race having a cylindrical inner peripheral surface; three brake cams provided radially inward of the outer race and arranged in a circumferential direction, each brake cam having a brake surface located opposite the inner peripheral surface and contactable with the inner peripheral surface and a cam surface facing radially inward and gradually changing a distance from a central axis of the inner peripheral surface; and an output-side rotating member disposed radially inward of the brake cams, wherein the output-side rotating member has abutting portions abuttable on the cam surfaces, wherein the braking device is configured such that when a rotation torque is applied to the brake cams, the cam surfaces push the abutting portions to rotate the output-side rotating member and that even when a rotation torque is applied to the output-side rotating member, the brake cams are not allowed to rotate in at least one rotational direction by the abutting portions pushing the cam surfaces to cause the brake surfaces to be pressed against the inner peripheral surface of the outer race, and wherein at least one urging member is provided between at least one pair of the brake cams among the three brake cams so as to urge the pair of the brake cams to be separated from each other.

With this configuration, since the urging member urges the brake cams to be separated from each other, play which would otherwise occur between the brake cams and the outer race is eliminated and the arrangement of the brake cams hardly loses a balance. Further, the contact between the brake cams and the inner peripheral surface of the outer race is improved, so that a frictional force can be generated efficiently between the brake cams and the inner peripheral surface and hence a braking force can be generated efficiently. As the braking device according to the present invention generates a braking force efficiently, it is possible to reduce the size and the weight of the braking device, for example, by reducing the thickness of the brake cams. Further, since the braking device according to the present invention includes three brake cams, the cam surfaces of the brake cams hold the output-side rotating member from three directions when a rotation torque is applied to the brake cams, so that the shaft of the output-side rotating member is stably centered and a stable operation can be achieved.

In the above-described braking device, a plurality of urging members may be arranged such that one urging member is disposed between each pair of the brake cams to cause the brake cams to be separated from each other.

With this configuration in which a plurality of urging members are arranged such that one urging member is disposed between each pair of the brake cams, the arrangement of the brake cams can be improved further in balance.

In the above-described braking device, the three brake cams may comprise a first brake cam having a first support surface configured to support one end of one urging member and a second brake cam having a second support surface configured to support another end of the one urging member, the first support surface and the second support surface may be slanted such that they are distanced from each other with increasing distance toward outside in a radial direction, and the one urging member may be in contact with the inner peripheral surface.

With this configuration, since the one urging member is supported at two ends thereof by the first support surface and the second support surface, and the first support surface and the second support surface are distanced from each other with increasing distance toward outside in the radial direction, the urging force of the one urging member acts as a force by which the urging member is shifted radially outward. Therefore, the one urging member contacts at three sides thereof the first support surface, the second support surface, and the inner peripheral surface, so that the position of the urging member can be stabilized in a self-sustained manner. Accordingly, it is not necessary to provide protrusions or the like on the brake cams for the purpose of regulating the position of the urging member, and a simple structure can be obtained.

Alternatively, in the above-described braking device, the three brake cams may comprise a first brake cam having a first support surface configured to support one end of one urging member and a second brake cam having a second support surface configured to support another end of the one urging member, the first support surface and the second support surface may be slanted such that they are distanced from each other with increasing distance toward inside in a radial direction, and the one urging member may be in contact with the output-side rotating member.

With this configuration, since the one urging member is supported at two ends thereof by the first support surface and the second support surface, and the first support surface and the second support surface are distanced from each other with increasing distance toward inside in a radial direction, the urging force of the one urging member acts as a force by which the urging member is shifted radially inward. Therefore, the one urging member contacts at three sides thereof the first support surface, the second support surface and the output-side rotating member, so that the position of the urging member can be stabilized in a self-sustained manner. Accordingly, it is not necessary to provide protrusions or the like on the brake cams for the purpose of regulating the position of the urging member, and a simple structure can be obtained.

In the above-described braking device, it is preferable that the urging member consists of a coil spring, and the coil spring is in contact with the inner peripheral surface along the length of the coil spring.

With this configuration, the coil spring is stably supported by the inner peripheral surface, so that a stable operation of the braking device can be achieved.

In the above-described braking device, it is preferable that each of the brake cams has a support surface configured to support one end or another end of the urging member and that the urging member is disposed radially outward of a position at which an extension plane of the cam surface and the support surface intersect with each other.

With this configuration, the urging member can be disposed at a position away from the output-side rotating member, so that the interference between the urging member and a part disposed around the axis of rotation (e.g., output-side rotating member) can be suppressed.

The above-described braking device may further comprise a friction generating member configured to be engaged with the output-side rotating member and pressed in contact with the inner peripheral surface, and the friction generating member may be disposed to overlap the urging member as viewed from an axial direction of the output-side rotating member.

With this configuration, the friction generating member can prevent the urging member(s) from being shifted in the axial direction.

The above-described braking device may further comprise an input-side rotating member configured to be engaged with the brake cams, and those portions of the input-side rotating member which are engaged with the brake cams may be at least partly arranged in a radial range in which the urging member is disposed.

With this configuration, as compared with the arrangement in which those portions of the input-side rotating member which are engaged with the brake cams and the urging member(s) are arranged in radially shifted positions, the shape of the brake cams can be simplified while an increase in the size can be suppressed.

The above-described braking device may further comprise an input-side rotating member configured to be engaged with the brake cams, and it is preferable that the input-side rotating member has surfaces contactable with the brake cams, which surfaces are smaller in size in a radial direction than surfaces of the urging member contactable with the brake cams.

With this configuration, the size of the input-side rotating member can be reduced in the radial direction so as to prevent the braking device from enlarging in size.

In the above-described braking device, it is preferable that the at least one pair of urging member is provided between only one pair of the brake cams.

With this configuration, the cam surfaces of the three brake cams receive adequately unbalanced pressing forces from the abutting portions of the output-side rotating member which abuts on the three brake cams, so that even when the braking device is subjected to vibration or the like, a high braking force can be retained.

In order to solve the above-described second object, the braking device according to the present invention is preferably configured such that the outer race has a pair of side surfaces located radially outward of the inner peripheral surface and orthogonal to the inner peripheral surface in a direction toward the axis of the inner peripheral surface and that the outer race is welded at one of the pair of side surfaces to a sheet-metal member configured to support the braking device.

With this configuration, since the sheet-metal member configured to support the braking device, which is a part constituting the housing, and the outer race are fixed by welding instead of swaging, the shape of the outer race can be simplified. Accordingly, the outer race to which a large stress is exerted is designed to have a mechanically favorable shape while having a reduced weight.

In the above-described braking device, the side surface and the sheet-metal member may be laser welded to each other.

With this configuration in which the side surface of the outer race and the sheet-metal member are laser welded to each other, it is possible to suppress distortion of the shape due to heat generated during welding and to generate the braking force efficiently, and further to suppress deterioration of the strength due to heat so as to give reserve strength to the outer race.

Further, in order to solve the above-described third object, the braking device according to the present invention may further comprise an input-side rotating member configured to be engaged with the brake cams in a rotating direction thereof; and a rotating force transmission member comprising an engagement portion engaged with the output-side rotating member so as to rotate together with the output-side rotating member, and transmission portions disposed to be abuttable on the input-side rotating member in a first rotating direction against the brake cams, and it is preferable that the output-side rotating member includes first abutting portions abuttable on the cam surfaces when a rotating force in the first rotating direction is applied to the output-side rotating member and second abutting portions abuttable on the cam surfaces when a rotating force in a second rotating direction is applied to the output-side rotating member, and that the output-side rotating member rotates when a rotation torque is imparted from the input-side rotating member to the brake cams, whereas when a rotation torque is imparted to the output-side rotating member, the transmission portions cause the brake cams to rotate through the input-side rotating member for the rotation torque in the first rotating direction but for the rotation torque in the second rotating direction, the second abutting portions push the cam surfaces to cause the brake surfaces to be pressed against the inner peripheral surface of the outer race so as to prevent the brake cams from rotating.

With this configuration, when a rotation torque is imparted to the output-side rotating member, the transmission portions cause the brake cams to rotate through the input-side rotating member for the rotation torque in the first rotating direction but for the rotation torque in the second rotating direction, the first abutting portions push the cam surfaces to cause the brake surfaces to be pressed against the inner peripheral surface of the outer race so as to prevent the brake cams from rotating, so that the braking device can be used as a one-way type braking device. If the rotating force transmission member is removed, for example, and the engagement between the rotating force transmission member and input-side rotating member in a rotational direction against the brake cams is removed, the first abutting portions push the cam surfaces and the brake surfaces are pressed against the inner peripheral surface of the outer race when a rotation torque in the first rotating direction is imparted to the output-side rotating member, whereby the rotation of the brake cams is inhibited. In other words, the braking device can be used as a two-way type braking device.

In the above-described braking device, the rotating force transmission member may be configured to be pressed in contact with the inner peripheral surface.

The braking device may be provided with a member configured to generate a frictional force as resistance (hereinafter referred to as a "frictional force generating member" in the description) so as to prevent an abrupt motion from occurring when the input-side rotating member is rotated because of a torque being imparted to the output-side rotating member. According to the configuration in which the rotating force transmission member is pressed in contact with the inner peripheral surface, the rotating force transmission member can also function as the frictional force generating member, so that the number of parts can be reduced.

Further, in order to solve the above-described fourth object, a clutch unit according to the present invention comprises: any of the braking devices described above; and a ratchet device configured to allow an input torque generated by a manipulation of a manipulation member to be transmitted to or disconnected from the braking device, wherein the ratchet device comprises: an output ring engageable with the braking device and disposed to be rotatable around an axis of the clutch unit; a manipulation input member engaged with the manipulation member and swingable together with the operating member; a plurality of movable pieces configured to allow the input torque to be transmitted or disconnected by engagement with or disengagement from the manipulation input member and the output ring; a cover member configured to cover the plurality of movable pieces from one side; and a restriction member having a side wall portion configured to cover the plurality of movable pieces from the other side and a plurality of restriction portions configured to restrict movements of the plurality of movable pieces in a circumferential direction of the output ring, wherein the restriction member is fitted into the cover member in such a manner as to inhibit a rotation of the restriction member relative to the cover member.

With this configuration, since the restriction member is fitted into the cover member to inhibit the rotation of the restriction member relative to the cover member, welding is not required and the manufacture can be made in a simple manner. As the restriction member restricts movements of the movable pieces in the circumferential direction as well as covers the movable pieces from one side, a large load is not applied to the restriction member; therefore, the restriction member can sufficiently achieve its function solely with the rotation-restriction made by fitting.

In the above-described clutch unit, it is preferable that the restriction member is press fitted into the cover member.

With this configuration in which the restriction member is fixed to the cover member by press fitting, the restriction member can be thinly fixed to the cover member.

DESCRIPTION OF EMBODIMENTS

First Embodiment

One embodiment of the present invention will be described in detail with reference made to the accompanying drawings where necessary.

Figure 1:
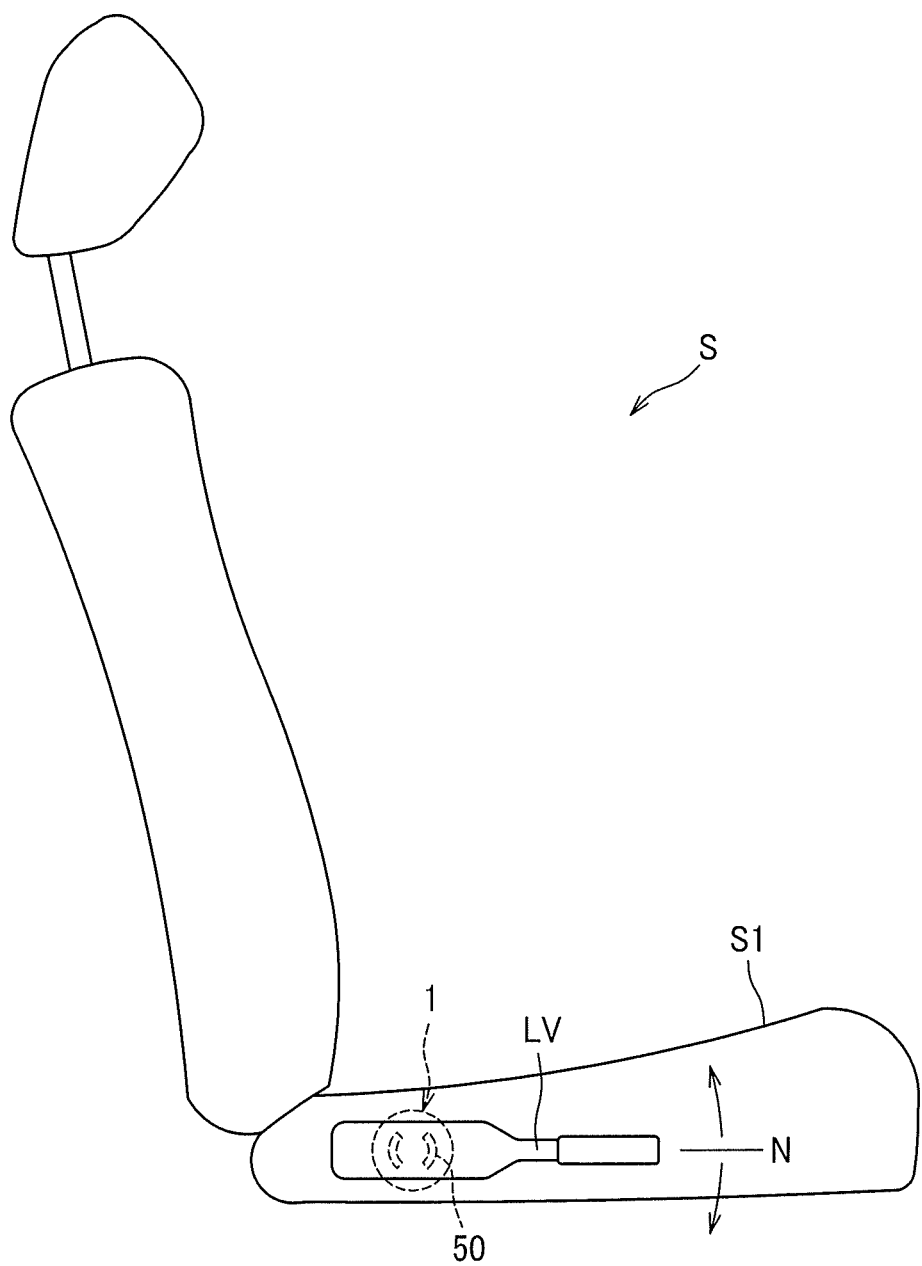
FIG. 1 is a side view of a vehicle seat.

As seen in FIG. 1, a clutch unit 1 according to one embodiment is applied to a known height adjustment mechanism configured to adjust height of a seat cushion S1 of a car seat S which is an example of a vehicle seat. The clutch unit 1 includes a lever LV attached to a manipulation input member 50, and when an output-side rotating member 30 to be described later is rotated by the manipulation of the lever LV to drive the height adjustment mechanism, the height of the seat cushion S1 can be adjusted. To be more specific, the seat cushion S1 is lifted by a predetermined amount when the lever LV is raised from a neutral position N, and the seat cushion S1 is lowered by a predetermined amount when the lever LV is lowered from the neutral position N. It is to be noted that the output-side rotating member 30 does not rotate when the lever LV is returned to the neutral position N from the upper or lower position.

Figure 2:
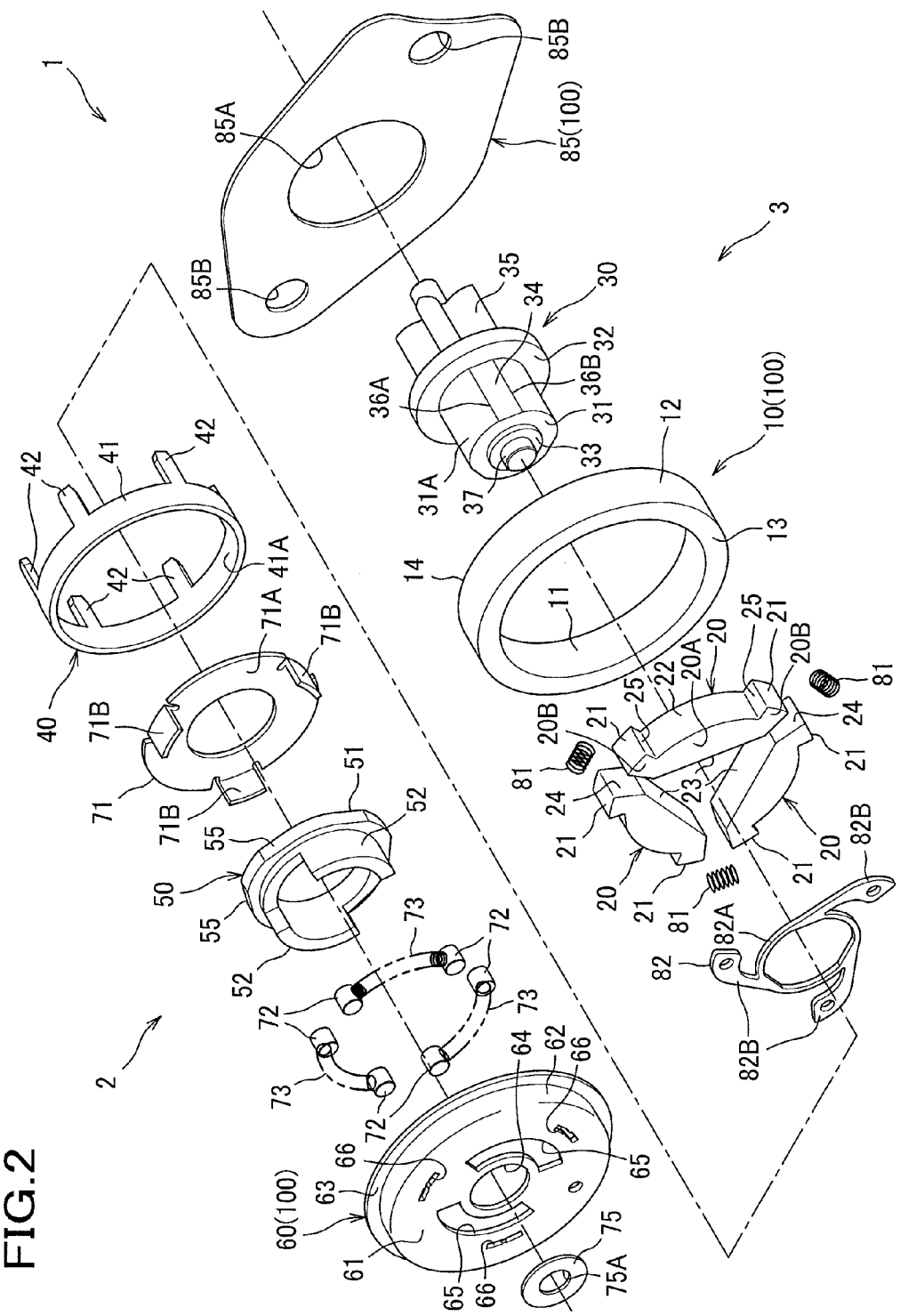
FIG. 2 is an exploded perspective view of a clutch unit according to a first embodiment.

As seen in FIG. 2, the clutch unit 1 includes a housing 100 in which various parts are stored. The housing 100 is formed by the combination of an outer race 10 which is a cylindrical portion, an attachment plate 85 as an example of an attachment member, and a cover member 60. In the following description, the left side of FIG. 2 in which the cover member 60 and the manipulation input member 50 are located is referred to as an "input-side" and the right side of FIG. 2 in which the output-side rotating member 30 is located is referred to as an "output-side".

The clutch unit 1 includes a ratchet device 2 provided on the input-side and configured to transmit or disconnect an input torque generated by a swinging motion of the manipulation input member 50, and a braking device 3 provided on the output-side and configured to transmit the input torque from the ratchet device 2 to an output gear 35 of the output-side rotating member 30 as well as to disconnect a reverse input torque from the output gear 35.

Constituent parts of the ratchet device 2 and the braking device 3 will be briefly described. The ratchet device 2 includes the manipulation input member 50, a restriction member 71, an output ring 40 as an input-side rotating member of the braking device 3, rollers 72 as an example of movable pieces, and return springs 73. The braking device 3 includes the outer race 10, brake cams 20 as an example of a braking force generating member, springs 81 as an example of urging members, the output-side rotating member 30, a friction ring 82 as an example of a friction generating member, and a washer 75. It is to be noted that the output ring 40 functions not only as an output member for the ratchet device 2 but also as an input member for the braking device 3, and therefore the output ring 40 can be considered as a part constituting the ratchet device 2 and also as a part constituting the braking device 3.

Next, configurations of the braking device 3 and the ratchet device 2 will be described in detail.

First, the configuration of the braking device 3 will be described.

The outer ring 10 is made of a ring having a predetermined wall thickness and includes an inner peripheral surface 11, a cylindrical outer peripheral surface 12, and a pair of side surfaces 13, 14 connecting the inner peripheral surface 11 and the outer peripheral surface 12. The pair of side surfaces 13, 14 are located radially outward of the inner peripheral surface 11 (in the radially outward direction of the outer ring 10) and define planes orthogonal to the inner peripheral surface in a direction toward an axis of the inner peripheral surface 11. It should be noted that in this description, the terms "in the radial direction (radially)" and "in the circumferential direction (circumferentially)" are determined based on the outer race 10.

The attachment plate 85 which constitutes a part of the housing 100 in combination with the outer ring 10 is a sheet-metal member configured to support the braking device 3. The attachment plate 85 has two attachment holes 85B (as attachment portions) through which the braking device 3 is attached to a frame of a seat cushion S1 or the like. Further, a through-opening 85A for the output-side rotating member 30 to be inserted therethrough is formed at a center of the attachment plate 85. The outer race 10 is fixed to the attachment plate 85, which allows the clutch unit 1 to be attached to various devices.

Figure 4:
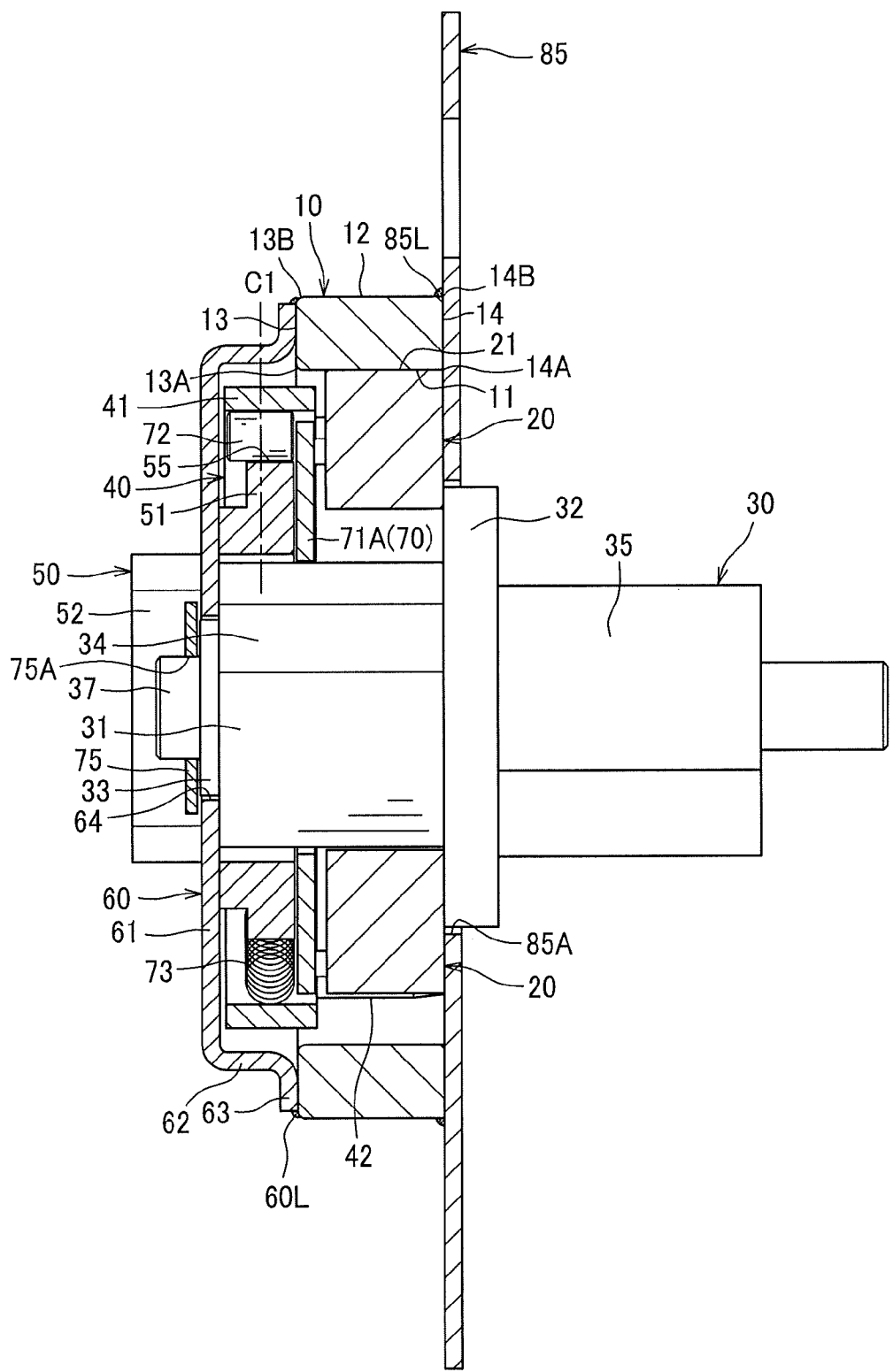
FIG. 4 is a sectional view of the clutch unit taken along the lines Z-Z of FIG. 3.
Figure 6:
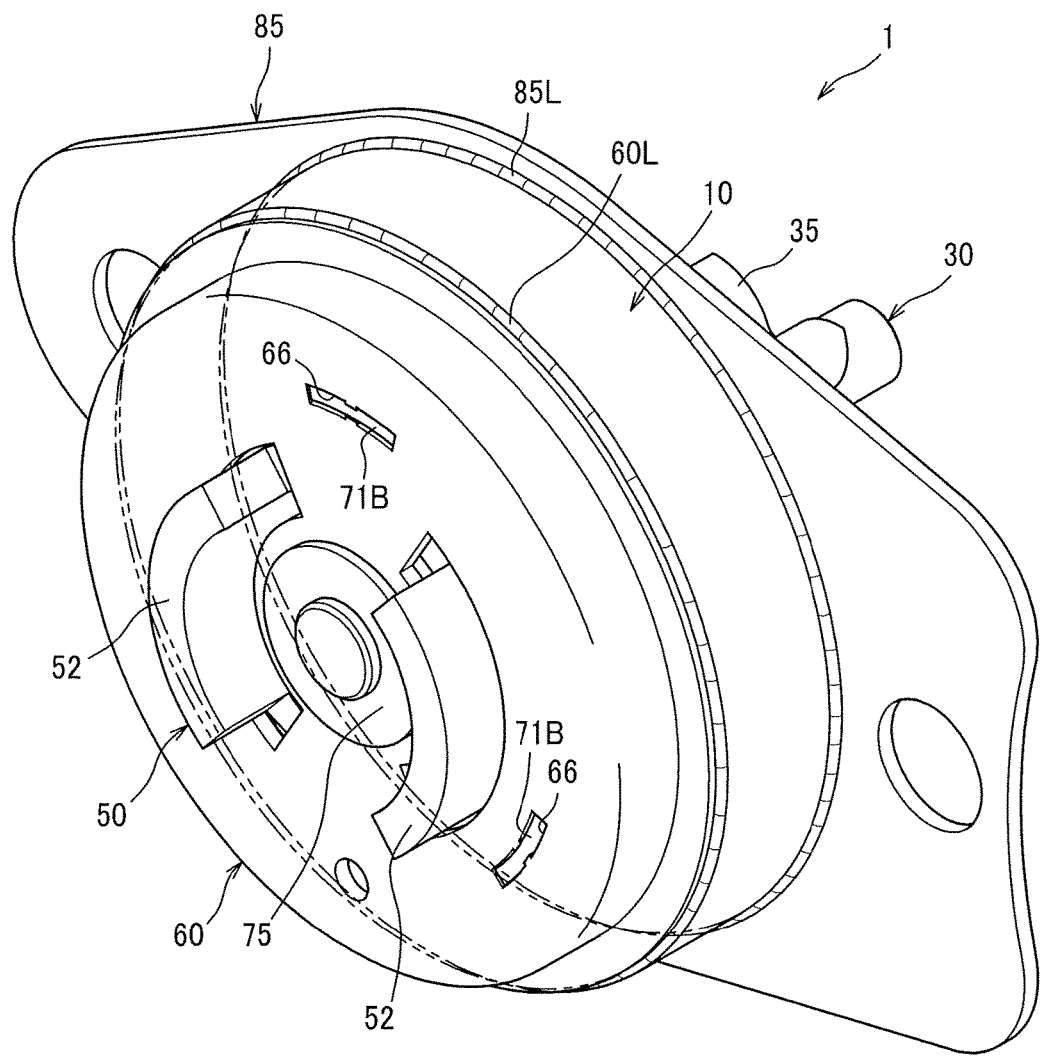
FIG. 6 is a perspective view of the clutch unit as viewed from a cover member side.

The outer race 10 is formed by stamping a thick plate, and as seen in FIGS. 4 and 6, an input-side side surface 13 has roll overs (shear drops) formed by the stamping process at an inner peripheral edge 13A that is an edge of the inner periphery and at an outer peripheral edge 13B that is an edge of the outer periphery. On the contrary, an output-side surface 14 has no roll overs (shear drops) at an inner peripheral edge 14A and at an outer peripheral edge 14B. The outer race 10 is welded to an input-side surface of the attachment plate 85 by laser welding at the outer peripheral edge 14B of the output-side surface 14 where no roll overs are formed. Accordingly, the side surface 14 and the attachment plate 85 can closely contact each other and the outer peripheral edge 14B can closely contact the attachment plate 85, so that a favorable welding can be performed.

The welding is done along the entire periphery of the outer peripheral edge 14B as shown in FIG. 6. Since the attachment plate 85 is welded to the outer race 10 along the entire periphery of the side surface 14, the welding strength can be enhanced and the outer race 10 can be reinforced by the attachment plate 85. Further, since the side surface 14 and the attachment plate 85 are welded together along the outermost peripheral portion of the annular-shaped side surface 14, the retention force provided by welding against a force in a rotational direction is enhanced.

The laser welding is carried out from the side of the attachment plate 85 on which the outer race 10 is located; therefore, a weld bead 85L hardly protrudes from the outer (output-side) surface of the attachment plate 85.

For this reason, it is not necessary to remove the weld bead 85L or it is not necessary to arrange other parts at positions away from the weld bead 85L taking into consideration protrusion of the weld bead 85L.

Returning to FIG. 2, the brake cams 20 are members configured to generate a braking force with respect to the outer race 10; three brake cams 20 are arranged inward of the outer race 10 at regular intervals along the circumferential direction of the outer race 10. Each brake cam 20 includes a main body portion 20A extending in the circumferential direction and protruding portions 20B protruding radially outward from both circumferential ends of the main body portion 20A. Brake surfaces 21 are provided at radially outward distal ends of the protruding portions 20B, opposite the inner peripheral surface 11 of the outer race 10. Each brake surface 21 has a cylindrical surface having a radius equal to that of the inner peripheral surface 11 of the outer race 10, and when the brake cam 20 is urged in the radially outward direction, the brake surface 21 is brought into close contact with the inner peripheral surface 11 of the outer race 10.

The brake cam 20 has an outer peripheral surface 22 between a pair of brake surfaces 21; the outer peripheral surface 22 has a diameter smaller than that of the brake surfaces 21. The brake cam 20 has a radially inner surface, which is a flat surface facing the central axis of the outer race 10. This flat surface is a cam surface 23 whose distance from the central axis of the inner peripheral surface (i.e., central axis of the output-side rotating member 30) gradually changes, and is disposed to abut on the output-side rotating member 30 to be described later. Further, the brake cam 20 has end faces 24 at both circumferential end portions thereof, which end faces 24 connect both ends of the cam surface 23 and end portions of the two brake surfaces 21.

The brake cam 20 also has stepped portions formed between the brake surfaces 21 and the outer peripheral surface 22, which stepped portions form rotating force input surfaces 25 that face in the circumferential direction.

Figure 3:
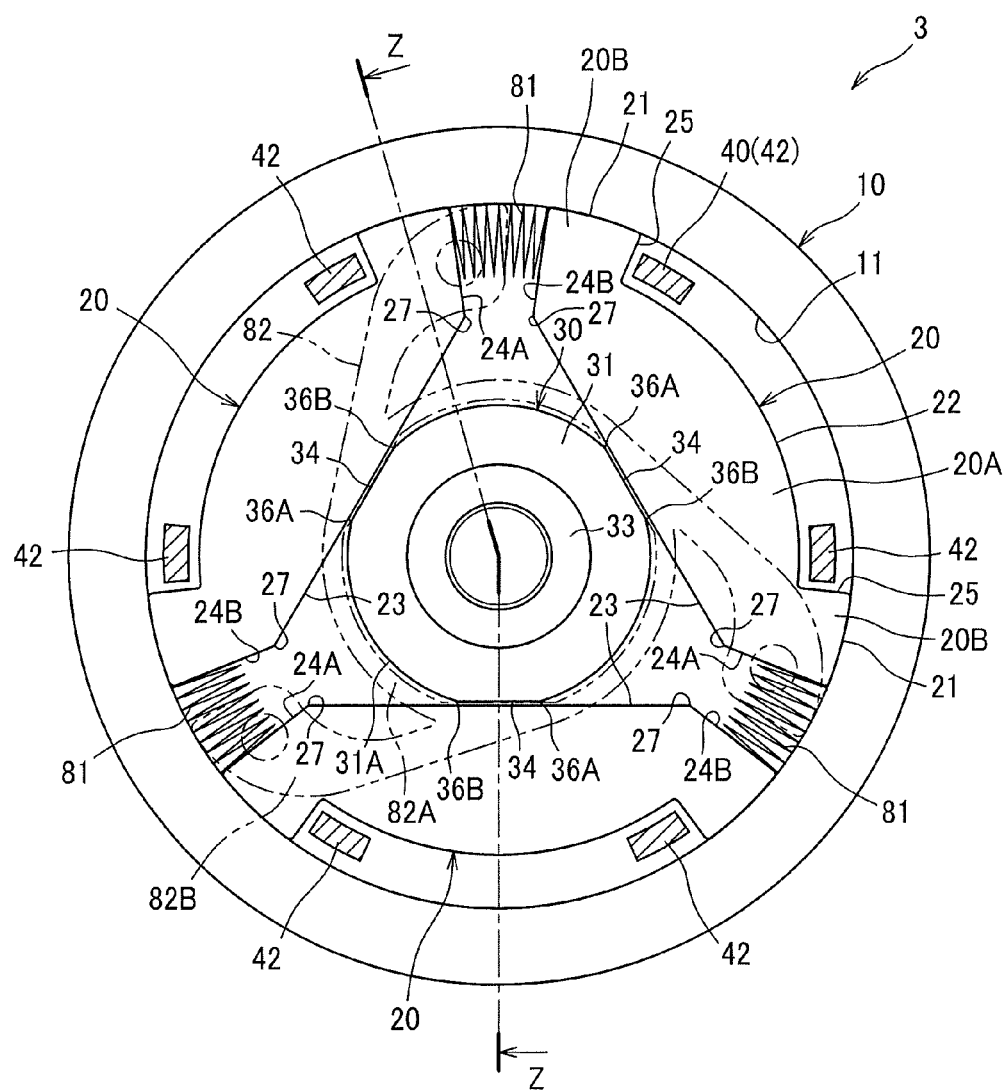
FIG. 3 is a transverse section of a braking device.

As seen in FIG. 3, the end faces 24 include an end face 24A facing in the clockwise direction and an end face 24B facing in the counterclockwise direction. The end faces 24A, 24B facing each other are not parallel to each other and slanted such that they are distanced from each other with increasing distance toward outside in the radial direction. In this embodiment, each end face 24A, 24B is also slanted away from the radial direction. A spring 81 made of a compression coil spring is disposed between the opposed end faces 24A, 24B with an initial load being applied to the coil spring 81, and the end face 24A as a first support surface of a first brake cam supports one end of the spring 81 and the end face 24B as a second support surface of a second brake cam supports the other end of the spring 81. Since the end face 24A and the end face 24B are slanted such that they are distanced from each other with increasing distance toward outside in the radial direction, the spring 81 moves radially outward in a self-sustained manner and contacts the inner peripheral surface 11 of the outer race 10; in this position, the spring 81 is surrounded peripherally and supported by the inner peripheral surface 11, the end face 24A, and the end face 24B, so that the spring 81 is stably positioned. Further, since the spring 81 urges the brake cams 20 to be separated from each other, play which would otherwise occur between the brake cams 20 and the outer race 10 is eliminated and the arrangement of the brake cams 20 hardly loses a balance.

Further, the spring 81 is in contact with the inner peripheral surface 11 along the length of the spring 81; by this arrangement, the spring 81 is stably supported by the inner peripheral surface 11, so that a stable operation of the braking device 3 can be achieved. Further, each of the springs 81 is disposed radially outward of a position at which the end faces 24A, 24B as the support surface and an extension plane of the cam surface 23 (the cam surface 23 itself in this embodiment) intersect with each. With this configuration, the spring 81 can be disposed at a position away from the output-side rotating member 30, so that the interference between the spring 81 and a part disposed around the axis of rotation (e.g., output-side rotating member 30) can be suppressed.

As seen in FIG. 4, the brake cams 20 are arranged such that the output-side side surfaces of the brake cams 20 are slidable on the attachment plate 85 and that the brake surfaces 21 are slidable on the inner peripheral surface 11 of the outer race 10. As described previously, since the outer race 10 and the attachment plate 85 are laser welded together along the outer peripheral edge 14B of the outer race 10, a weld bead 85L does not protrude out into a region of a corner portion defined by the inner peripheral surface 11 and the input-side surface of the attachment plate 85, so that a smooth operation of the brake cams 20 can be ensured.

Returning to FIG. 2, the output-side rotating member 30 includes a shaft-shaped acting portion 31, a flange 32 formed on the output-side of the acting portion 31, a support shaft portion 33 protruding toward the input-side from the acting portion 31 coaxially with the acting portion 31 and having a diameter smaller than that of the acting portion 31, a shaft portion 37 protruding toward the input-side from the support shaft portion 33 coaxially with the support shaft portion 33 and having a diameter smaller than that of the support shaft portion 33, and an output gear 35 protrudingly formed on the output-side of the flange 32. The output gear 35 extends through the through-opening 85A of the attachment plate 85 and protrudes toward the output-side.

As seen in FIG. 3, the acting portion 31 is generally shaped like a cylindrical column as a whole; this cylindrical columnar shape has a diameter slightly greater than that of an inscribed circle of the three cam surfaces 23. Further, the acting portion 31 has opposed surfaces 34 at positions facing the three cam surfaces 23; the opposed surfaces 34 are flat surfaces located opposite the three cam surfaces 23 with slight clearance between them. Gentle corners made at the boundaries between the cylindrical outer peripheral surface 31A of the acting portion 31 and the opposed surfaces 34 are portions abutting on the cam surfaces 23 when the brake cams 20 or the output-side rotating member 30 are caused to rotate; these portions include an abutting portion 36A (second abutting portion) corresponding to an edge portion of each opposed surface 34 located at a side in the counterclockwise direction in FIG. 3 and an abutting portion 36B (first abutting portion) corresponding to an edge portion of each opposed surface 34 located at a side in the clockwise direction. The first abutting portion 36B is abuttable on the cam surface 23 when a rotating force in the counterclockwise direction (first rotating direction) is applied to the output-side rotating member 30, and the second abutting portion 36A is abuttable on the cam surface 23 when a rotating force in the clockwise direction (second rotating direction) is applied to the output-side rotating member 30.

As seen in FIG. 2, the friction ring 82 is a member configured to generate a friction which can prevent an abruptly starting operation of the output-side rotating member 30 upon disconnection of a braking force of the braking device 3. The friction ring 82 includes a ring portion 82A having an opening coinciding with the outer peripheral shape of the acting portion 31 of the output-side rotating member 30, and friction-generating arms 82B extending radially outward from the ring portion 82A and having distal portions pressed in contact with the inner peripheral surface 11 of the outer race 10. The friction ring 82 rotates together with the output-side rotating member 30 with the acting portion 31 engaging with the opening of the ring portion 82A.

The friction-generating arms 82B extend obliquely away from the radial direction in the clockwise direction in FIG. 3 so as to be distanced from a line extending in the radially outward direction. For this reason, when the friction ring 82 rotates in the clockwise direction of FIG. 3, the friction-generating arms 82B easily abut against the inner peripheral surface 11 and thus generate larger frictional forces than when rotating in the counterclockwise direction. Therefore, in the case in which the clutch unit 1 is applied to a brake of the height adjustment mechanism for the car seat S, if the clutch unit 1 is assembled such that the vehicle seat S is lowered when the output-side rotating member 30 rotates clockwise in FIG. 3, undesirable drop of the car seat S can be efficiently prevented.

The friction-generating arms 82B are disposed on the input-side of the springs 81, and disposed to overlap the springs 81 as viewed from the axial direction of the output-side rotating member 30. With this configuration, the springs 81 can be prevented from being shifted axially toward the input-side.

Returning to FIG. 2, the washer 75 has an opening 75A having a diameter slightly smaller than the outer diameter of the shaft portion 37 of the output-side rotating member 30, and the shaft portion 37 is press fitted into this opening 75A (see FIG. 4). The outer diameter of the washer 75 is larger than a support opening 64 of the cover member 60 to be described later, so that the washer 75 prevents the output-side rotating member 30 from coming off toward the output-side.

Next, the configuration of the ratchet device 2 will be described.

As seen in FIG. 2, the output ring 40 is rotatable around the axis of parts such as the outer race 10 and the output-side rotating member 30; the output ring 40 is a member engageable with the brake cams 20 of the braking device 3 to transmit a rotation output of the ratchet device 2 to the brake cams 20. The output ring 40 is manufactured by sheet metal working of a metal plate, and includes a thin plate-like pressure-receiving ring portion 41 and a plurality of engageable legs 42 protruding from the pressure-receiving ring portion 41 toward the output-side. The inner peripheral surface 41A of the pressure-receiving ring portion 41 has a circular cross-section.

Six engageable legs 42 are arranged at regular intervals; among these engageable legs 42, as seen in FIG. 3, two engageable legs 42 each are disposed between a pair of protruding portions 20B of one brake cam 20. In other words, the size of the space between the pair of protruding portions 20B of each brake cam 20 described above is set accordingly, and a slight play is formed between each of the protruding portions 20B and the adjacent engageable leg 42. Further, the engageable legs 42 have the same size and are arranged in the same radial position.

Further, at least part of the engageable legs 42 are arranged in a radial range in which the springs 81 are disposed; in this embodiment, the entire engageable legs 42 are arranged within the radial range in which the springs 81 are disposed by way of example. Namely, the engageable legs 42 are arranged concentrically with the springs 81. With this configuration, as compared with the arrangement in which the engageable legs 42 and the springs 81 are arranged in radially shifted positions, the shape of the brake cams 20 can be simplified while an increase in the size of the brake cams 20 can be suppressed.

Further, the size of the surfaces of the engageable legs 42 contacting the brake cams 20 in the radial direction is smaller than the size of the surfaces of the springs 81 contacting the brake cams 20 in the radial direction; with this configuration, the size of the output ring 40 can be reduced in the radial direction so as to prevent upsizing of the braking device 3.

As seen in FIG. 2, the manipulation input member 50 is a member which on one hand engages with the lever LV and is swingable together with the lever LV and on the other hand engages with the output ring 40 through rollers 72 as movable pieces to transmit a rotation torque from the lever LV to the output ring 40. For this purpose, the manipulation input member 50 includes a cam plate portion 51 and two lever engagement portions 52 extending from the cam plate portion 51 toward the input-side.

Figure 5:
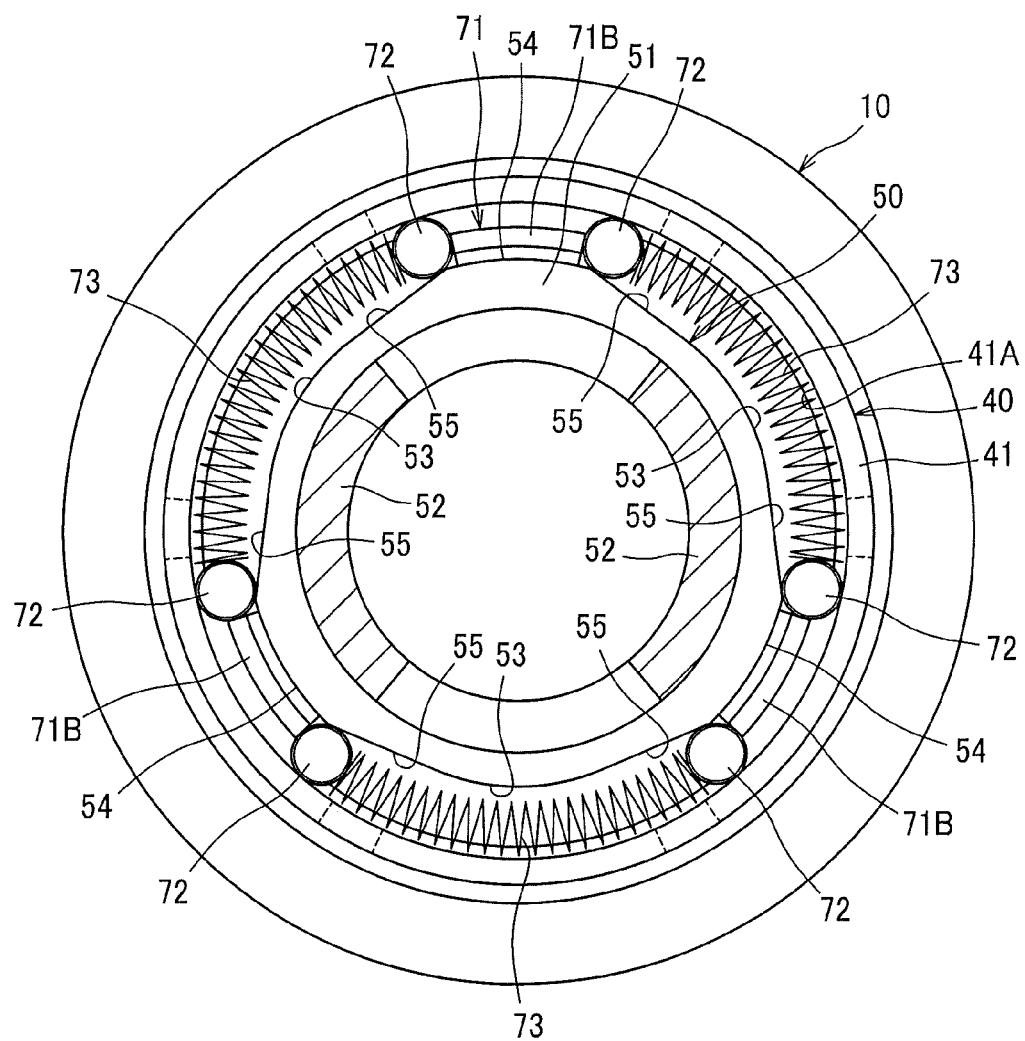
FIG. 5 is a transverse section of a ratchet device.

As seen in FIG. 5, the cam plate portion 51 includes three small-diameter portions 53 and three large-diameter portions 54 which are arranged alternately along the outer peripheral surface of the cam plate portion 51, and a cam surface 55 consisting of a flat surface connects each small-diameter portion 53 and each large-diameter portion 54. There are six switching portions at which the small-diameter portion 53 and the large-diameter portion 54 are switched; thus, Six cam surfaces 55 are formed correspondingly. The cam surfaces 55 are formed such that the distance thereof from the central axis gradually changes.

Rollers 72 are disposed between each of the cam surfaces 55 and the inner peripheral surface 41A of the pressure-receiving ring portion 41. As will be understood by the description of the operation to be given later, the rollers 72 are configured to engage with or disengage from the manipulation input member 50 and the output ring 40 to thereby transmit or disconnect an input torque. The total six rollers 72 are provided corresponding to the number of cam surfaces 55. As seen in FIG. 4, the length of each cam surface 55 in the axial direction is longer than one half of the length of the rollers 72 in the axial direction, and the cam surfaces 55 are arranged in such a manner as to be abuttable on the rollers 72 in a region containing axially center portions (see center line C1) of the rollers 72. With this arrangement, the rollers 72 can be stably retained between the cam surfaces 55 and the pressure-receiving ring portion 41.

Returning now to FIG. 2 to describe the restriction member 71, the restriction member 71 is a member configured to restrict positions of the rollers 72, and includes a side wall portion 71A configured to cover the plurality of rollers 72 from one side on the output-side and three restriction portions 71B extending toward the input-side from the outer peripheral edge of the side wall portion 71A. The restriction portions 71B are longer than the axial length of the rollers 72, and distal ends of the restriction portions 71B are press fitted into fitting holes 66 of the cover member 60 as will be described later.

As seen in FIG. 5, the restriction portions 71B are disposed radially outward of the large-diameter portions 54 and in the same rotating positions during the non-operating time when the lever LV is not manipulated; the restriction portions 71B restrict circumferential movements of the rollers 72 disposed between the cam surfaces 55 and the pressure-receiving ring portion 41. Provided between two rollers 72 arranged between two adjacent restriction portions 71B is a return spring 73 made of a compression coil spring; the return spring 73 is disposed with an initial load applied. Accordingly, in the non-operating time as shown in FIG. 5, the rollers 72 come into contact with the restriction portions 71B. It is to be noted that the restriction portions 71B are arranged on a circle along which the centers of the rollers 72 are positioned in the radial direction of the outer race 10, and that each of the restriction portions 71B is in contact with the peripherally outermost portions of the rollers 72 which are most protruding portions of the rollers 72 in the circumferential direction. With this arrangement, the restriction portions 71B can stably support the rollers 72. It should be noted that although FIG. 5 illustrates the rollers 72 in contact with the restriction portions 71B, the rollers 72 may be slightly separated from the restriction portions 71B with the rollers 72 being retained between the cam surfaces 55 and the inner peripheral surface 41A.

The lever engagement portions 52 extend out from the cam plate portion 51 and each has a circular arc cross-section. The lever engagement portions 52 are engaged with the lever LV (not shown in the drawings).

As seen in FIG. 2, the cover member 60 includes a disc-shaped side wall portion 61, a cylindrical outer peripheral portion 62 extending toward the output-side from the outer peripheral edge of the side wall portion 61, and a flange 63 extending radially outward from the output-side end portion of the outer peripheral portion 62. As seen in FIGS. 4 and 6, the flange 63 is put together with the side surface 13 of the outer race 10 and then welded to the side surface 13 by laser welding along the outer peripheral edge of the flange 63. The outer race 10 is reinforced by the cover member 60 that has been welded as described above. The welding is done along the entire peripheral edge of the flange 63.

The diameter of the flange 63 is slightly smaller than the diameter of the outer race 10, so that the flange 63 is located radially inward of the outer peripheral surface of the outer race 10. This makes a weld bead 60L hardly protrude out from the outer peripheral surface of the outer race 10; therefore, it is not necessary to remove a protrusive weld bead 60L by grinding or it is not necessary to separate other parts to a greater extent taking into consideration the interference between the other parts and the weld bead 60L. Further, since the cover member 60 is welded to the outer race 10 along the outer peripheral edge of the cover member 60, the outer race 10 is reinforced by the cover member 60 and a stress to be exerted on the outer race 10 around its outer periphery can be reduced by the cover member 60. Accordingly, the braking device 3 can generate a large braking force.

As seen in FIG. 2, the side wall portion 61 has a circular support opening 64 provided at a center portion of the side wall portion 61, two circular arc openings 65 extending around the support opening 64 in the form of segments of a circle, and three fitting holes 66 located radially outward of the circular arc openings 65 and arranged at regular intervals along the circumferential direction.

The support opening 64 is a portion into which the support shaft portion 33 of the output-side rotating member 30 is fitted so that the output-side rotating member 30 is rotatably supported.

The circular arc openings 65 are provided in positions corresponding to the lever engagement portions 52 of the manipulation input member 50; each of the circular arc openings 65 is shaped to follow a circular arc and extends in an angular range that is wider than that of the lever engagement portion 52. With this configuration, the circular arc openings 65 receive the lever engagement portions 52 and allow the lever engagement portions 52 to move in the circular arc openings 65 by a predetermined angular range.

The fitting holes 66 are through-openings provided at three portions corresponding to the three restriction portions 71B of the restriction member 71, and the restriction member 71 is fitted into the cover member 60 in such a manner as to inhibit a rotation of the restriction member 71 relative to the cover member 60. Since the restriction member 71 and the cover member 60 are fitted at a plurality of portions, a rotation of the restriction member 71 can be restricted in a reliable manner.

Figure 7:
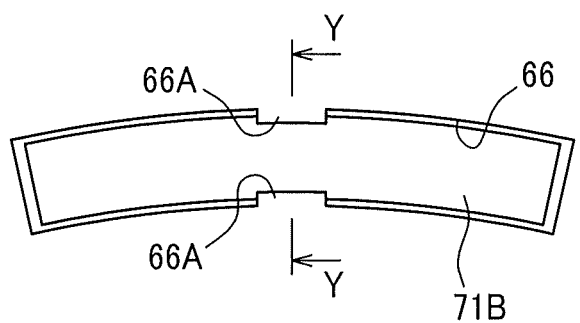
FIG. 7 includes (a) an enlarged front view illustrating a press fitted state of a restriction member and a fitting opening, and (b) a sectional view illustrating the press fitted state of the restriction member and the fitting opening, taken along the line Y-Y of FIG. 7 (a).
Figure 7:
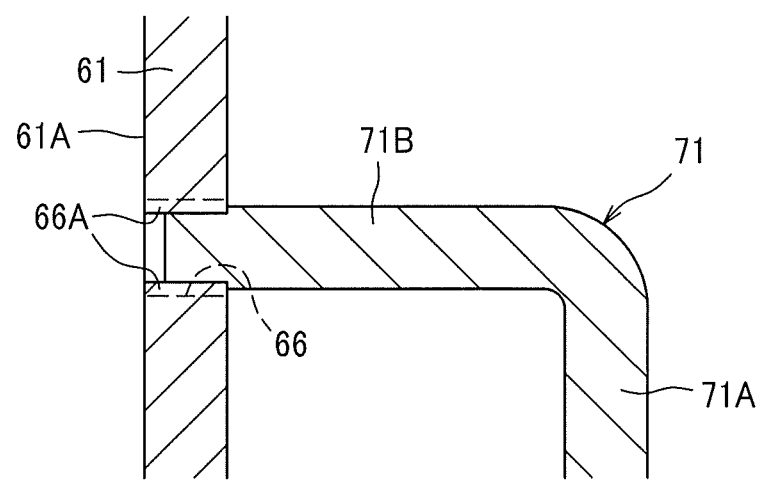

As seen in FIGS. 6, 7(a) and 7(b), two protruding portions 66A are provided at a circumferential center portion of each fitting hole 66; the protruding portions 66A protrude inward of the fitting hole 66 to hold the restriction portion 71B. The size (gap size) of the fitting hole 66 in the radial direction at a portion other than the protruding portions 66A is slightly larger than the thickness (plate thickness) of the restriction portion 71B, and the gap size between the protruding portions 66A is slightly smaller than the plate thickness of the restriction portion 71B. The restriction portion 71B is press fitted into the fitting hole 66 with the distal end portion of the restriction portion 71B being inserted into a gap between the two protruding portions 66A, so that the restriction member 71 is firmly fixed to the cover member 60 with an appropriate press-fitting load. As seen in FIG. 7(b), the distal end of the restriction portion 71B does not stick out from the outer surface 61A of the side wall portion 61. Therefore, interference between the distal end of the restriction portion 71B and another part can be suppressed.

Next, the operation of the clutch unit 1 configured as described above will be described.

First, the operation of the ratchet device 2 will be described. In a neutral position shown in FIG. 5, the rollers 72 are positioned between the inner peripheral surface 41A of the output ring 40 and the cam surfaces 55 of the manipulation input member 50; however, small gaps are present between these parts and the rollers 72 are not retained by the inner peripheral surface 41A and the cam surfaces 55. The rollers 72 are pressed against the restriction portions 71B by the return springs 73. When the manipulation input member 50 is caused to turn clockwise by a small amount by the manipulation of the lever LV, the cam surfaces 55 rotate clockwise to contact the rollers 72, whereby the rollers 72 are retained between the inner peripheral surface 41A and the cam surfaces 55. Accordingly, the manipulation input member 50 and the output ring 40 can rotate together.

Figure 8:
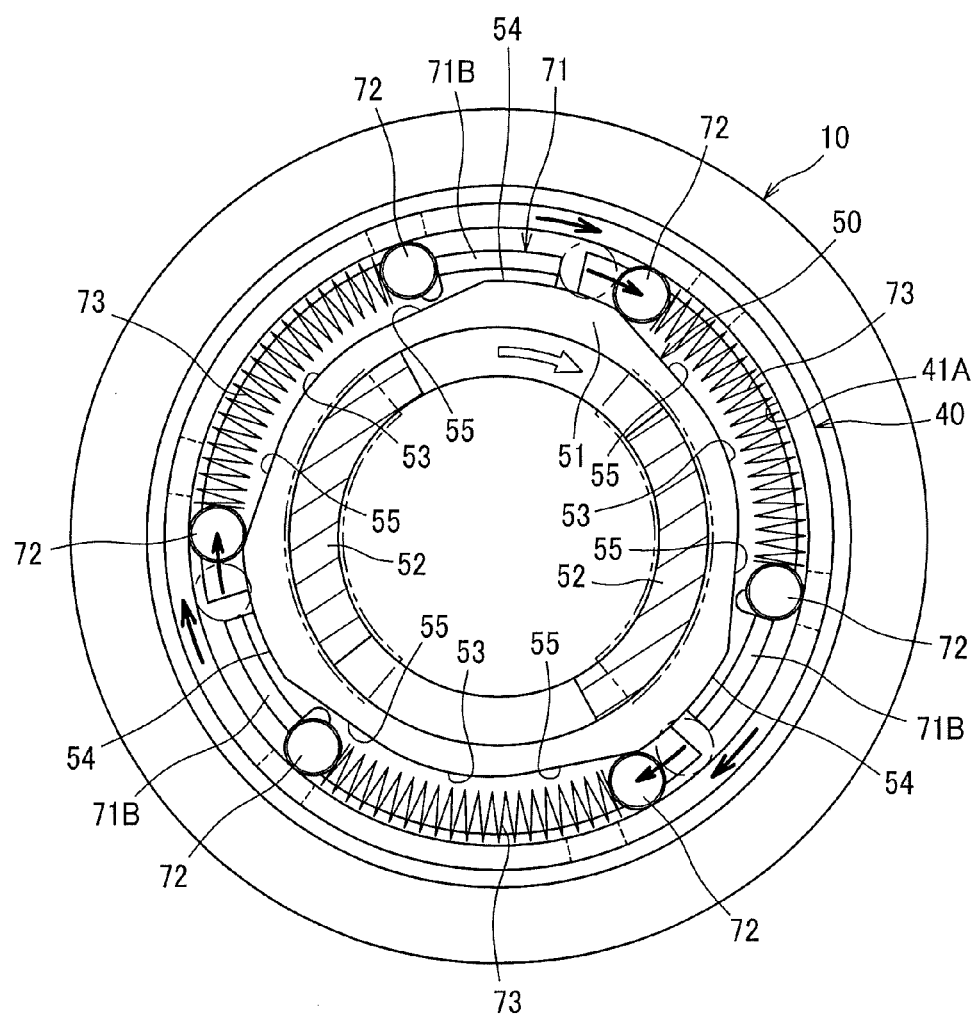
FIG. 8 is a view explaining an operation of the ratchet device, showing a state in which a manipulation input member has been rotated in the clockwise direction.

For this reason, when the manipulation input member 50 is caused to rotate clockwise as shown in FIG. 8, the output ring 40 and the manipulation input member 50 rotate together in the clockwise direction. In other words, the input torque by which the manipulation input member 50 is being rotated is transmitted to the output ring 40.

Figure 9:
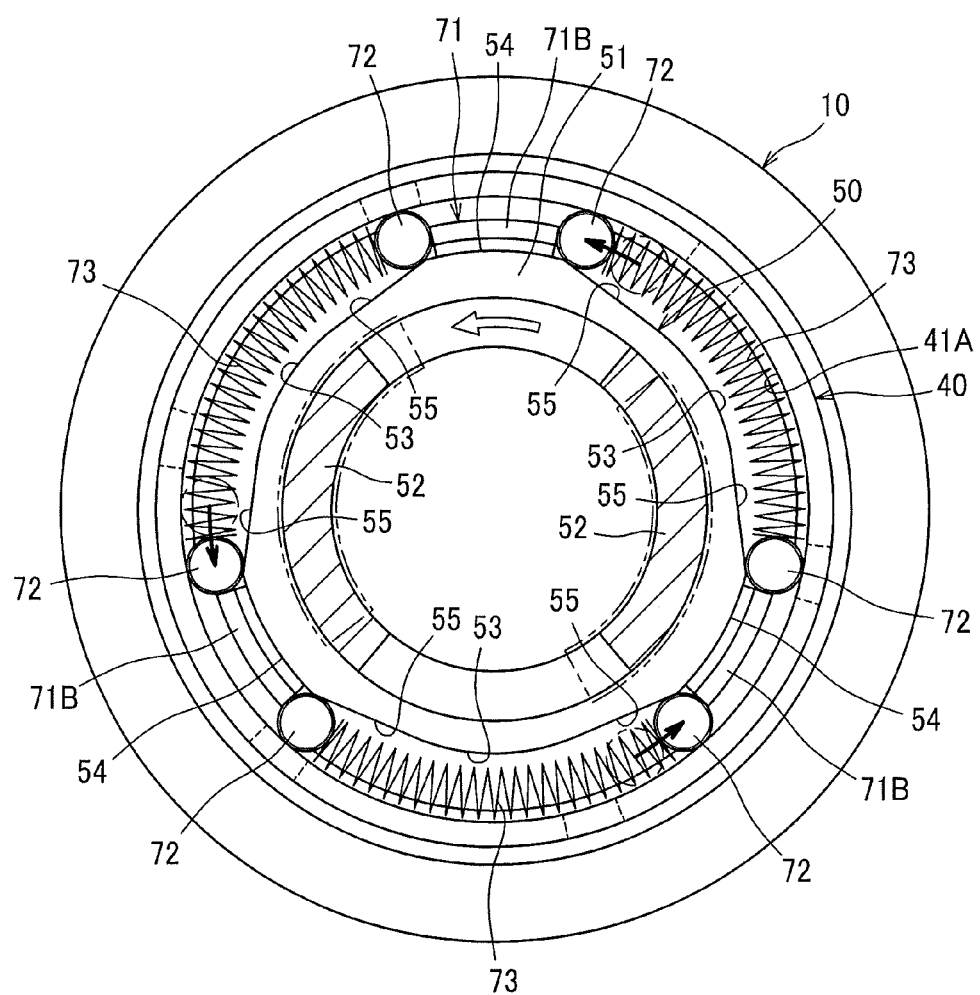
FIG. 9 is a view explaining the operation of the ratchet device, showing a state in which the manipulation input member has been rotated reversely in the counterclockwise direction.

When the lever LV is turned counterclockwise to cause the manipulation input member 50 to return from the state shown in FIG. 8 to the neutral position, the cam surfaces 55 move counterclockwise away from the rollers 72 and the rollers 72 are not retained by the cam surfaces 55 and the inner peripheral surface 41, so that as seen in FIG. 9, the manipulation input member 50 rotates toward the neutral position while the output ring 40 is kept stationary. In other words, the input torque produced when the manipulation input member 50 is returned is not transmitted to the output ring 40 and thus disconnected. The urging force of the return springs 73 assists the manipulation of the manipulation input member 50 toward the neutral position and keeps the manipulation input member 50 in the neutral position.

Manipulations of raising the lever LV from the neutral position and returning the lever LV from the upper position to the neutral position are similar to those described above, and explanation thereof will be omitted.

Description will be given of the operation of the braking device 3 when the output ring 40 is caused to rotate by the manipulation of the lever LV as described above.

Figure 10:
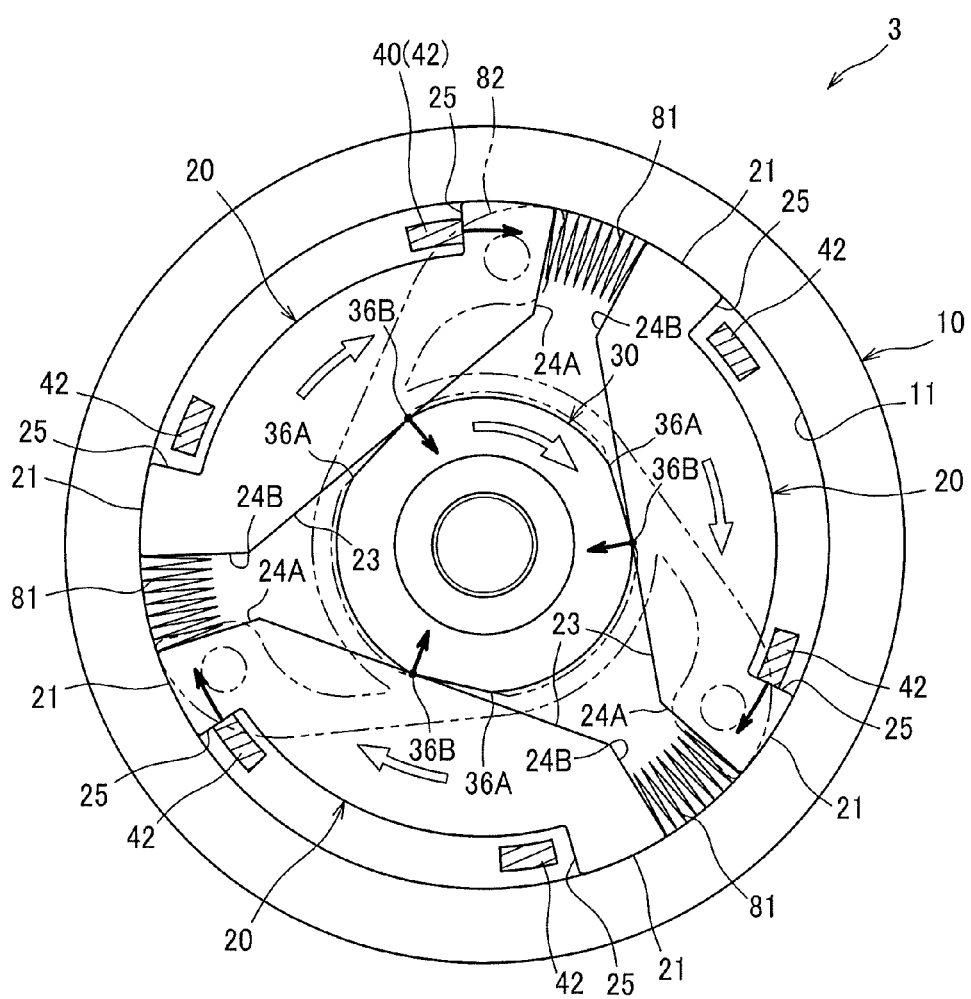
FIG. 10 is a view explaining an operation of the braking device, showing a state in which a rotating force in the clockwise direction has been imparted to an output ring.

As seen in FIG. 10, when a rotation torque (input torque) in the clockwise direction is imparted from the output ring 40 as the input-side rotating member, the engageable legs 42 of the output ring 40 abut on the rotating force input surfaces 25 to push the rotating force input surfaces 25, so that the brake cams 20 start rotating clockwise. Then, the cam surfaces 23 abut on the abutting portion 36B of the output-side rotating member 30, and the brake cams 20 exert a rotating force in the clockwise direction (see arrows) to the output-side rotating member 30. Accordingly, when the output ring 40 is caused to rotate clockwise, the output ring 40, the brake cams 20 and the output-side rotating member 30 rotate together in the clockwise direction.

Figure 11:
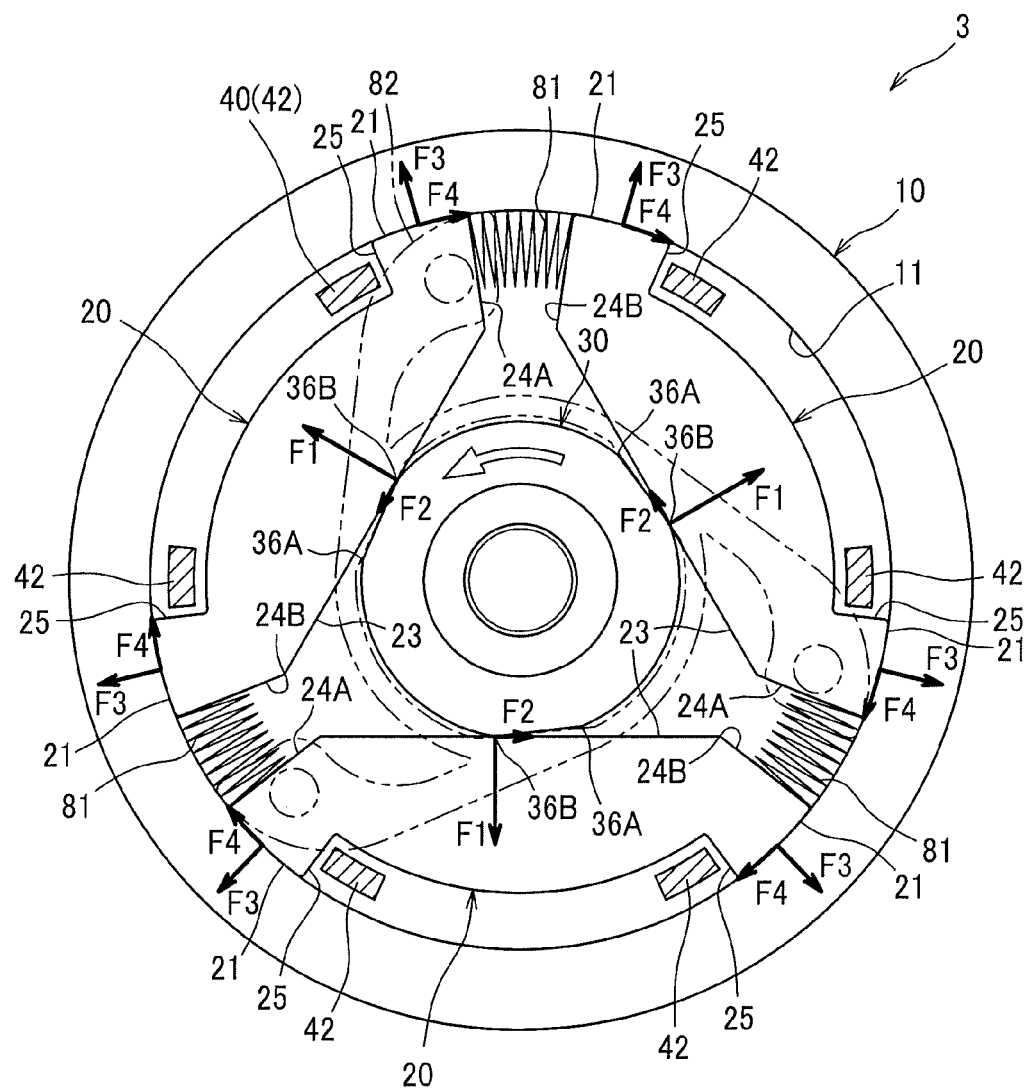
FIG. 11 is a view explaining the operation of the braking device, showing a state in which a rotating force in the counterclockwise direction has been imparted to an output-side rotating member.

As seen in FIG. 11, when a rotating force in the counterclockwise direction of the figure (second rotating direction reverse to first rotating direction) is applied to the output-side rotating member 30, the three abutting portions 36B abut on the cam surfaces 23 of the corresponding brake cams 20 to push the cam surfaces 23 in the radially outward direction. Frictional forces F2 acting on the abutting points in accordance with the forces F1 for pushing the cam surfaces 23 act, through slightly, in such a manner as to rotate the brake cams 20 in the counterclockwise direction.

The forces F1 produce forces F3 by which the brake cams 20 are pressed against the inner peripheral surface 11 of the outer race 10 at the brake surfaces 21. Further, in response to the forces F3, frictional forces F4 that resist the forces tending to impart counterclockwise rotation to the brake cams 20 act between the inner peripheral surface 11 and the brake surfaces 21. According to the braking device 3 in this embodiment, as the forces (derived from the frictional forces F2) for causing the brake cams 20 to rotate counterclockwise does not overcome the frictional forces F4, the output-side rotating member 30, the brake cams 20 and the output ring 40 cannot rotate relative to the outer race 10. Namely, even if a rotation torque in the counterclockwise direction is applied to the output-side rotating member 30, the brake cams 20 cannot rotate because of the brake surfaces 21 pressed against the inner peripheral surface 11. Accordingly, the braking device 3 can generate a braking force.

According to this embodiment, the brake cams 20, the output-side rotating member 30 and the output ring 40 are configured in a mirror symmetrical manner (line-symmetrical in FIG. 3); therefore, when the output ring 40 is caused to rotate counterclockwise, the way that the forces are applied and the rotating direction are reversed, so that the output ring 40, the brake cams 20 and the output-side rotating member 30 rotate together in the counterclockwise direction. On the other hand, when the output-side rotating member 30 is caused to rotate clockwise, the way that the forces are applied is reversed and the forces act similarly as with the rotation in the counterclockwise direction, so that the output-side rotating member 30, the brake cams 20 and the output ring 40 cannot rotate relative to the outer race 10. Namely, the braking device 3 can generate a braking force.

According to the clutch unit 1 in this embodiment, the following advantageous effects can be achieved.

In the braking device 3, each of the springs 81 urges the brake cams 20 to be separated from each other, play which would otherwise occur between the brake cams 20 and the outer race 10 is eliminated and the arrangement of the brake cams 20 hardly loses a balance. This can improve the contact between the brake cams 20 and the inner peripheral surface 11 of the outer race 10, so that a frictional force can be generated efficiently between the brake cams 20 and the inner peripheral surface 11 and hence a braking force can be generated efficiently. For this reason, according to the braking device 3, the braking force can be generated efficiently, and the size and the weight of the braking device 3 can be reduced. Further, since the braking device 3 includes three brake cams 20, the cam surfaces 23 of the brake cams 20 hold the output-side rotating member 30 from three directions when a rotation torque is applied to the brake cams 20, so that the shaft of the output-side rotating member 30 is stably centered and a stable operation can be achieved.

Especially, in this embodiment, since one spring 81 each is disposed between each pair of adjacent brake cams 20, the arrangement of the brake cams 20 can be improved further in balance.

Further, since the spring 81 contacts the end faces 24A, 24B and the inner peripheral surface 11 at three sides of the spring 81, and the position of the spring 81 can be stabilized in a self-sustained manner, it is not necessary to provide protrusions or the like on the brake cams 20 for the purpose of regulating the position of the spring 81, and a simple structure can be obtained.

Further, since the braking device 3 is configured such that the attachment plate 85 which is a part for constituting the housing 100 and the outer race 10 are fixed by welding instead of swaging, the shape of the outer race 10 can be simplified. Accordingly, the outer race 10 to which a large stress is exerted is designed to have a mechanically favorable shape such as a simple cylindrical shape while having a reduced weight.

Especially, this welding is laser welding; it is therefore possible to suppress distortion of the shape of the outer race 10 due to heat generated during welding and hence to generate the braking force efficiently, and further to suppress deterioration of the strength due to heat so as to give reserve strength to the outer race 10. Further, the cover member 60 and the outer race 10 are also fixed by welding instead of swaging, so that the shape of the outer race 10 can be simplified further. Accordingly, the outer race 10 to which a large stress is exerted is designed to have a mechanically favorable shape while having a reduced weight.

Further, the ratchet device 2 according to this embodiment can be assembled in a simple manner because the restriction member 71 is fitted into the cover member 60 to inhibit the rotation of the restriction member 71 relative to the cover member 60 and hence welding is not required. Further, since the restriction member 71 is configured to restrict movements of the rollers 72 in the circumferential direction as well as to cover the rollers 72 from one side on the output-side, and a large load is not applied to the restriction member 71, the restriction member 71 can sufficiently achieve its function solely with the rotation-restriction made by fitting. Especially in this embodiment, the restriction portions 71B are press fitted into the fitting holes 66 of the cover member 60, the restriction member 71 can be firmly fixed to the cover member 60.

Although the first embodiment has been described above, the present invention is not limited to the above-described embodiment and various changes and modifications may be made where necessary.

Figure 12:
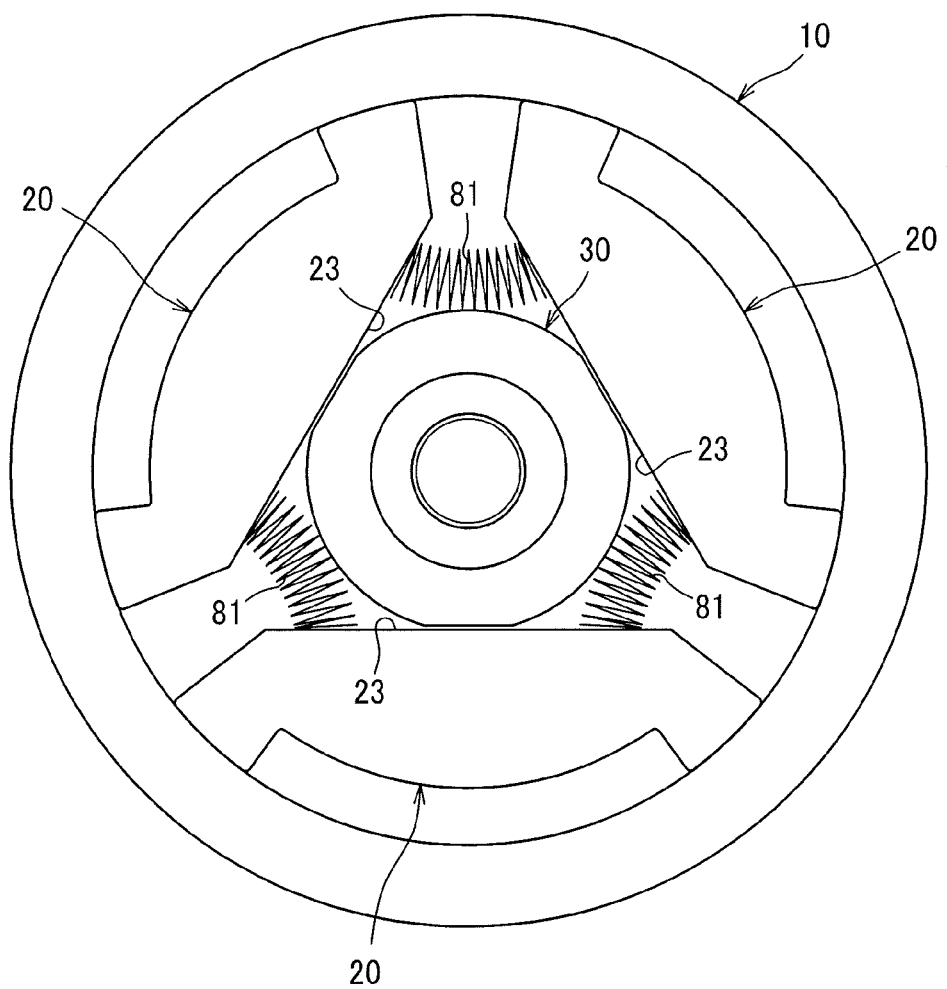
FIG. 12 is a sectional view of the braking device, explaining a first modification of the arrangement of urging members.

For example, as seen in FIG. 12, the springs 81 may be supported by two cam surfaces 23 of adjacent brake cams 20, of which one cam surface 23 functions as a first support surface and the other cam surface 23 functions as a second support surface. In this configuration, since the adjacent cam surfaces 23 are distanced from each other with increasing distance toward inside in the radial direction, the spring 81 itself moves radially inward by the urging force of the spring 81 and contacts the output-side rotating member 30, so that the spring 81 can be stabilized. In other words, the spring 81 is supported in such a manner as to be surrounded at three sides thereof by the two cam surfaces 23 and the output-side rotating member 30, so that the position of the spring 81 can be stabilized. Also, in this modification, it is not necessary to provide protrusions or the like on the brake cams 20 for the purpose of supporting the spring 81, and a simple structure can be obtained.

Figure 13:
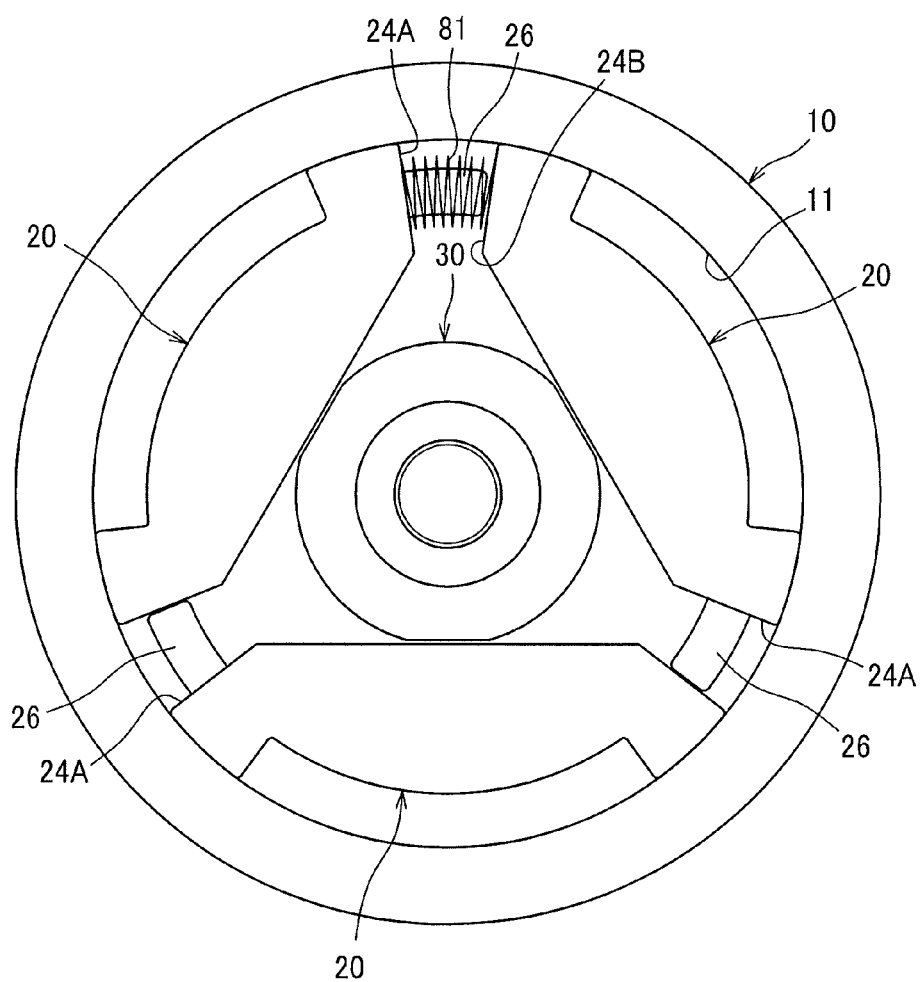
FIG. 13 is a sectional view of the braking device, explaining a second modification of the arrangement of the urging members.

Alternatively, as seen in FIG. 13, instead of providing one spring 81 between each pair of adjacent brake cams 20, only one spring 81 may be provided for the three brake cams 20. In this modification, it is preferable that a gap between the adjacent brake cams 20 is reduced, for example, by providing a protrusion 26 on the end face 24A of the brake cam 20. And only one spring 81 is disposed between the end face 24A and the end face 24B of one pair of brake cams 20. Also, with this configuration, play which would otherwise occur between the brake cams 20 and the outer race 10 is eliminated and the arrangement of the brake cams 20 will not lose a balance; this can improve the contact between the brake cams 20 and the inner peripheral surface 11 of the outer race 10, so that a braking force can be generated efficiently.

With this configuration, the cam surfaces 23 of the three brake cams 20 receive adequately unbalanced pressing forces from the abutting portions 36A, 36B of the output-side rotating member 30 which abuts on the three brake cams 20, so that even when the braking device 3 is subjected to vibration or the like, a high braking force can be retained. Especially, in the case of a configuration without protrusions 26, the urging force of the spring 81 by which the brake cams 20 are urged in the circumferential direction acts as a force for pressing the brake cams 20 and the output-side rotating member 30 against each other, so that even when the braking device 3 is subjected to strong vibration or the like, a high braking force can be retained.

Figure 14:
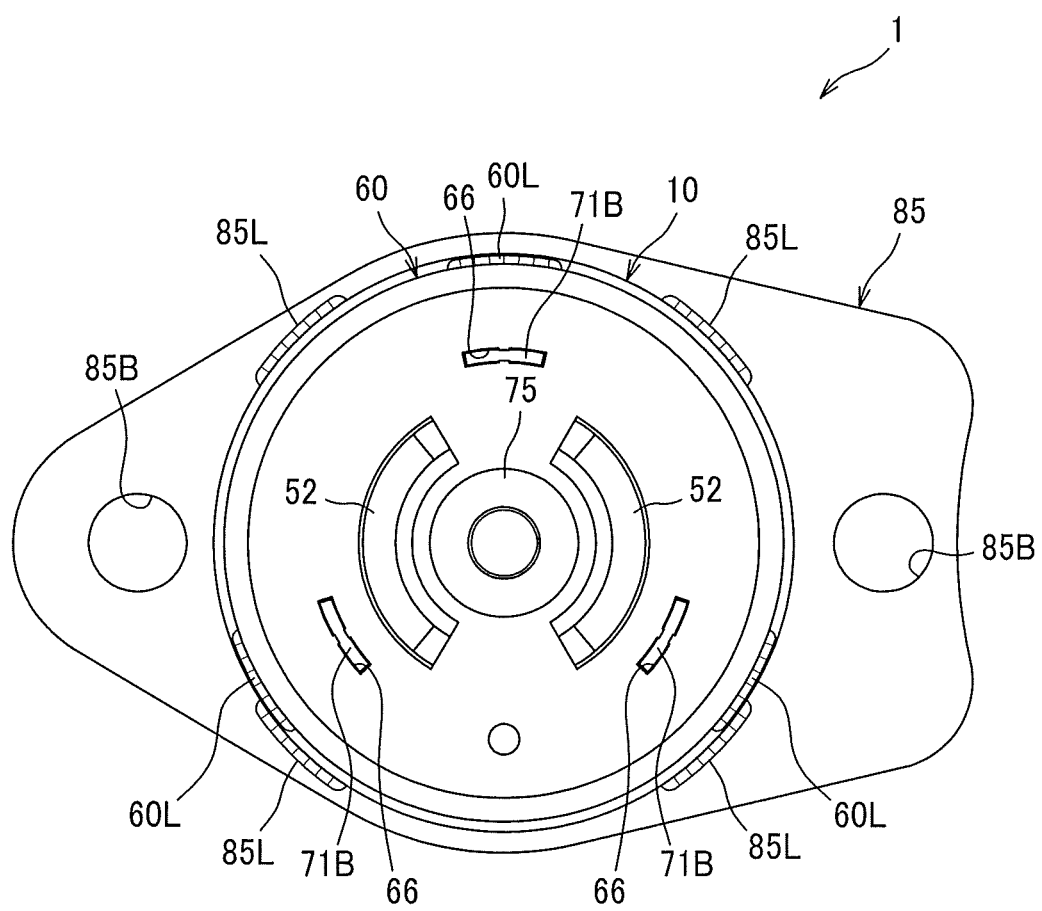
FIG. 14 is a front view of the clutch unit, illustrating a modification of welded portions.

Further, as seen in FIG. 14, instead of welding the attachment plate 85 and the outer race 10 continuously along the entire periphery of the outer race 10, the welding may be done discontinuously. With this configuration in which the welding is done discontinuously at the side surface 14 of the outer race 10, it is possible to reduce the cost. Similarly, instead of welding the outer race 10 and the cover member 60 continuously along the entire periphery of the cover member 60, the welding may be done discontinuously. With this configuration in which the welding is done discontinuously at the side surface 13 of the outer race 10, it is possible to reduce the cost.

It should be noted that in the case of discontinuous welding of the attachment plate 85 and the outer race 10 such as shown in FIG. 14, the welded portions, that is, weld beads 85L exposed to view in FIG. 14 are arranged for example at four corners and each of the attachment holes 85B is located between two nearby weld beads 85L (two weld beads 85L arranged in the upper-lower direction).

Further, although the outer race 10 and the cover member 60 are welded discontinuously, the fitted portions at which the restriction portions 71B are fitted into the corresponding fitting holes 66 overlap (as viewed in the radial direction) the weld beads 60L at which the cover member 60 and the outer race 10 are welded together. With this configuration, the fitted portions at which the restriction portions 71B are fitted into the fitting holes 66 and the weld beads 60L are located closer to each other to improve the support stiffness of the restriction member 71.

Figure 15:
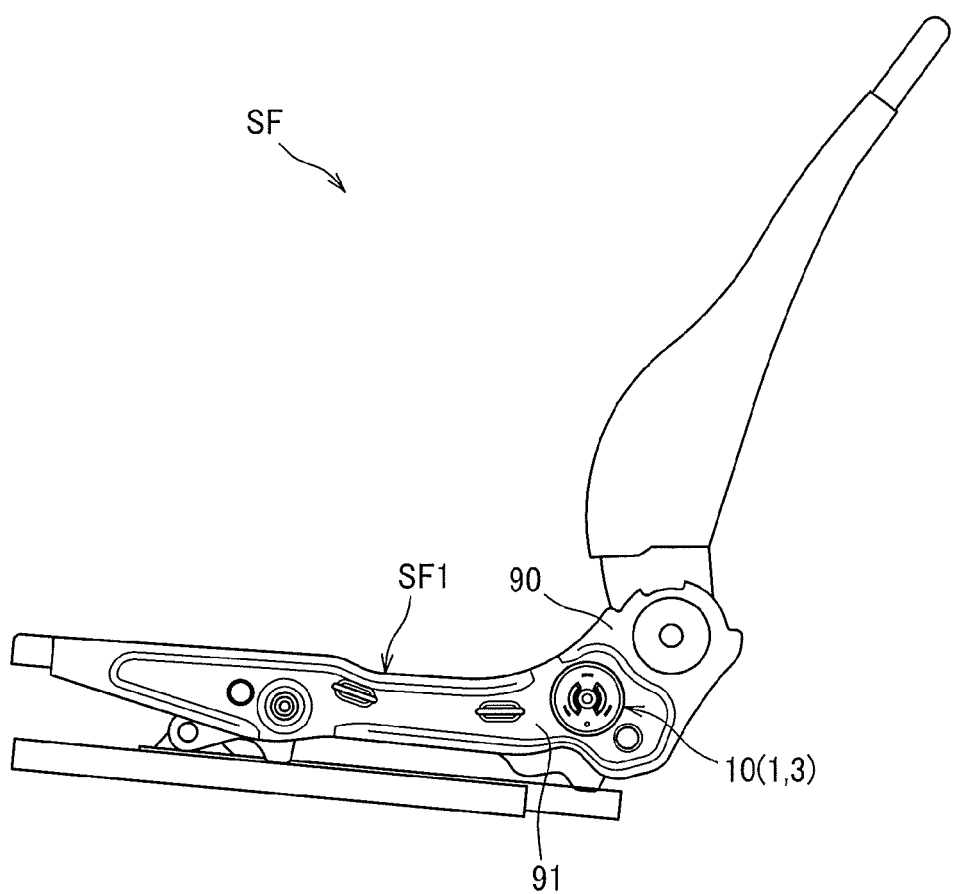
FIG. 15 is a side view of a seat frame, illustrating another example of a sheet-metal member.

Further, as seen in FIG. 15, the sheet-metal member for supporting the braking device 3 is not limited to the attachment plate 85 and may be a part of a seat frame SF of the car seat S. For example, the outer race 10 may be fixed directly to a side frame 90 of a seat cushion frame SF1 by welding. This can reduce the number of parts constituting the braking device 3. In this modification, if the braking device 3 (clutch unit 1) is fixed within a recessed region 91 which is recessed laterally inward that is part of the outer side surface of the side frame 90, the clutch unit 1 does not protrude laterally outward to a greater extent and the car seat S can be downsized.

Other modifications will be described below.

In the above-described embodiment, the springs 81 made of coil springs are used as an example of the urging members; however, leaf springs or sponge-like members may be used. Further, in the case in which the urging member is provided between each pair of brake cams 20, these parts may be connected together as an integrally formed single piece.

The movable pieces used in the ratchet device 2 are not limited to the rollers 72; as long as they are small pieces engageable with and disengageable from the cam surfaces 55 and the inner peripheral surface 41A, the shape of the movable pieces is not limited and may be sphere or wedge.

In the above-described embodiment, when a rotation torque is applied to the output-side rotating member 30, the braking force can be generated in the normal direction as well as in the reverse direction; however, if portions engageable with the brake cams 20 in one rotating direction are provided, it is possible to prevent the braking force from generating in the one rotating direction.

In the above-described embodiment, the fitting holes 66 are formed as through-openings; however, the fitting holes 66 may be bottomed holes. Further, although the restriction portions 71B are press fitted into the fitting holes 66, any fitting method other than press fitting may be used.

In the above-described embodiment, the outer race 10 constitutes a part of the housing 100. However, the present invention is not limited to this configuration, and a housing as a separate part from the brake-side outer race may be employed.

Further, the braking device 3, the ratchet device 2 and the clutch unit 1 are applicable not only to the height adjustment mechanism for the car seat S but also for other devices where appropriate.

Second Embodiment

Description will be given of an embodiment in which the above-described two-way type clutch unit 1 can be used as a one-way type clutch unit by replacing the friction ring 82 as a friction generating member with a friction ring 82' which also functions as a rotating force transmission member.

Constituent elements similar to those described in the above-described first embodiment are denoted by the same reference numerals, and detailed description thereof will be omitted.

Figure 16:
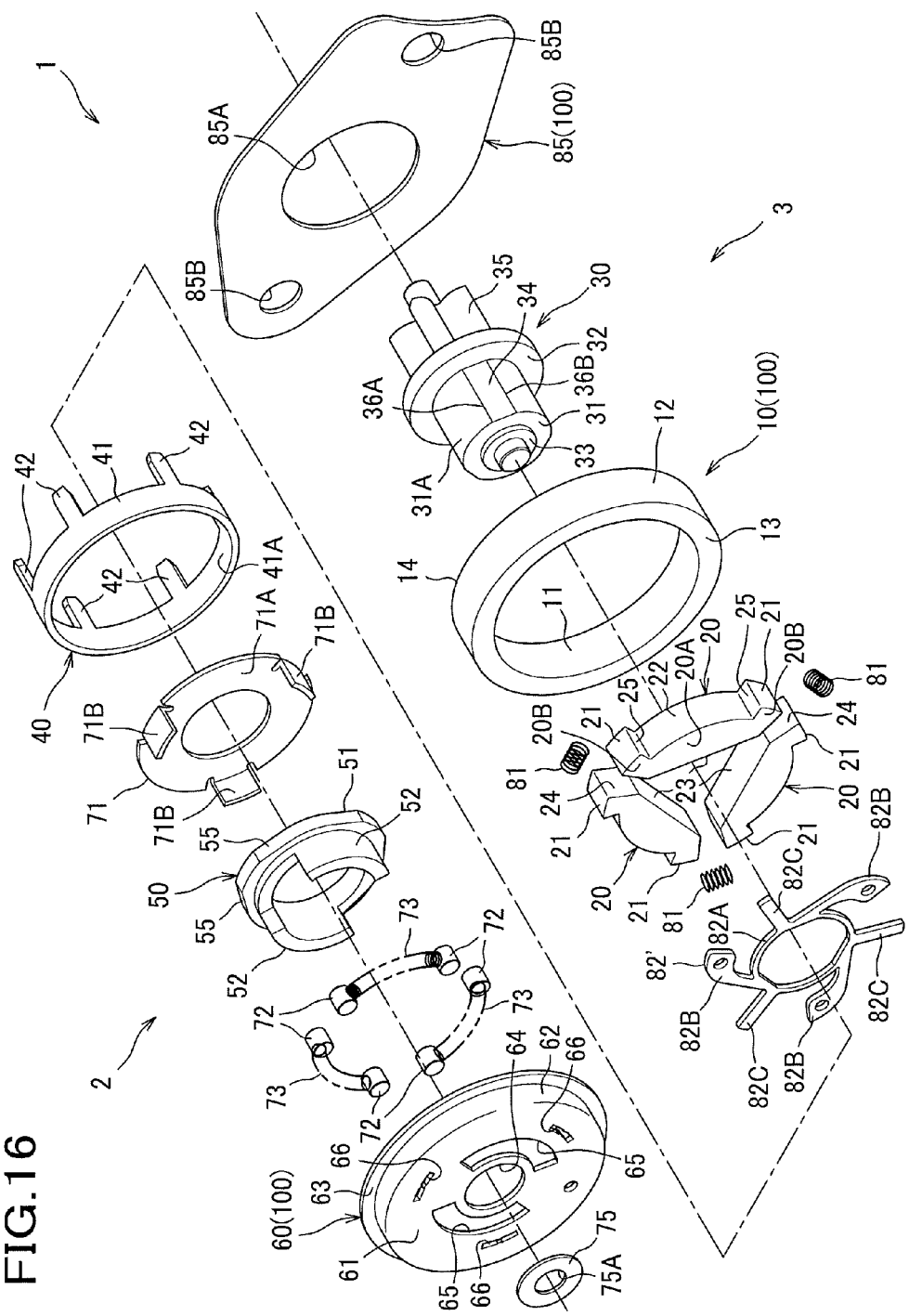
FIG. 16 is an exploded perspective view of the clutch unit according to a second embodiment.

As seen in FIG. 16, the friction ring 82' is a member configured to generate a friction which can prevent an abruptly starting operation of the output-side rotating member 30 upon disconnection of a braking force of the braking device 3 and also a member configured to transmit a counterclockwise rotating force of the output-side rotating member 30 to the brake cams 20 through the output ring 40. The friction ring 82' is formed by stamping a plate member (sheet metal) having a constant thickness; the friction ring 82' includes a ring portion 82A (as an example an engagement portion in the shape of a ring) having an opening coinciding with the outer peripheral shape of the acting portion 31 of the output-side rotating member 30, friction-generating arms 82B extending radially outward from the ring portion 82A and having distal portions pressed in contact with the inner peripheral surface 11 of the outer race 10, and rotating force transmission all is 82C (as an example of transmission portions) extending radially outward from the ring portion 82A.

Figure 17:
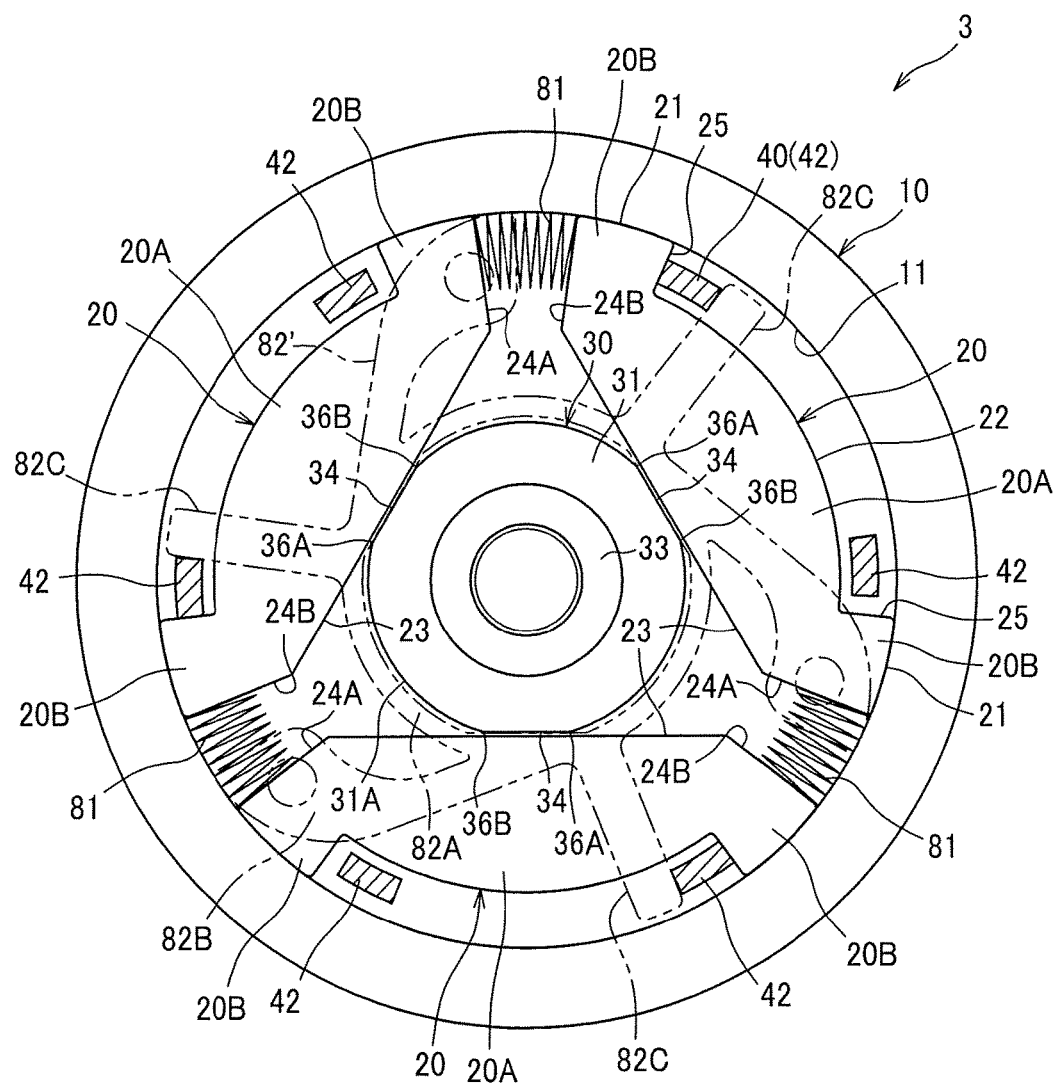
FIG. 17 is a transverse section of the braking device.

The friction ring 82' is configured to rotate together with the output-side rotating member 30 with the help of the opening of the ring portion 82A engaged with the acting portion 31. The friction ring 82' is in a position axially shifted from the brake cams 20 along the axis of rotation, and as seen in FIG. 17, a part of the friction ring 82' overlaps the brake cams 20 as viewed from the axial direction.

Three rotating force transmission anus 82C are provided such that they are abuttable on the corresponding engageable legs 42 of the output ring 40 in the counterclockwise direction. The engageable legs 42 are engageable with the rotating force input surfaces 25 of the brake cams 20 in a rotating direction.

Each of the rotating force transmission arms 82C described above is located adjacent to two engageable legs 42 disposed between a pair of protruding portions 20B, and more specifically at a position adjacent to a clockwise side of one engageable leg 42 that is located on the counterclockwise side. The rotating force transmission arms 82C are slightly deformed and contact the engageable legs 42 in the rotating direction with the engageable leg 42 being retained between each of the rotating force transmission arms 82C and the corresponding protruding portion 20B of the brake cam 20. This can prevent play of the output ring 40.

The operation of the clutch unit 1 configured as described above will be described.

First, the operation of the ratchet device 2 will be described.

In the neutral position shown in FIG. 5, the rollers 72 are positioned between the inner peripheral surface 41A of the output ring 40 and the cam surfaces 55 of the manipulation input member 50; however, small gaps are present between these parts and the rollers 72 are not retained by the inner peripheral surface 41A and the cam surfaces 55. The rollers 72 are pressed against the restriction portions 71B by the return springs 73. When the manipulation input member 50 is caused to turn clockwise by a small amount by the manipulation of the lever LV, the cam surfaces 55 rotate clockwise to contact the rollers 72, whereby the rollers 72 are retained between the inner peripheral surface 41A and the cam surfaces 55. Accordingly, the manipulation input member 50 and the output ring 40 can rotate together.

For this reason, when the manipulation input member 50 is caused to rotate clockwise as shown in FIG. 8, the output ring 40 and the manipulation input member 50 rotate together in the clockwise direction. In other words, the input torque by which the manipulation input member 50 is being rotated is transmitted to the output ring 40.

When the lever LV is turned counterclockwise to cause the manipulation input member 50 to return from the state shown in FIG. 8 to the neutral position, the cam surfaces 55 move counterclockwise away from the rollers 72 and the rollers 72 are not retained by the cam surfaces 55 and the inner peripheral surface 41, so that as seen in FIG. 9, the manipulation input member 50 rotates toward the neutral position while the output ring 40 is kept stationary. In other words, the input torque produced when the manipulation input member 50 is returned is not transmitted to the output ring 40 and thus disconnected. The urging force of the return springs 73 assists the manipulation of the manipulation input member 50 toward the neutral position and keeps the manipulation input member 50 in the neutral position.

Manipulations of raising the lever LV from the neutral position and returning the lever LV from the upper position to the neutral position are similar to those described above, and explanation thereof will be omitted.

Description will be given of the operation of the braking device 3 when the output ring 40 is caused to rotate by the manipulation of the lever LV as described above.

Figure 18:
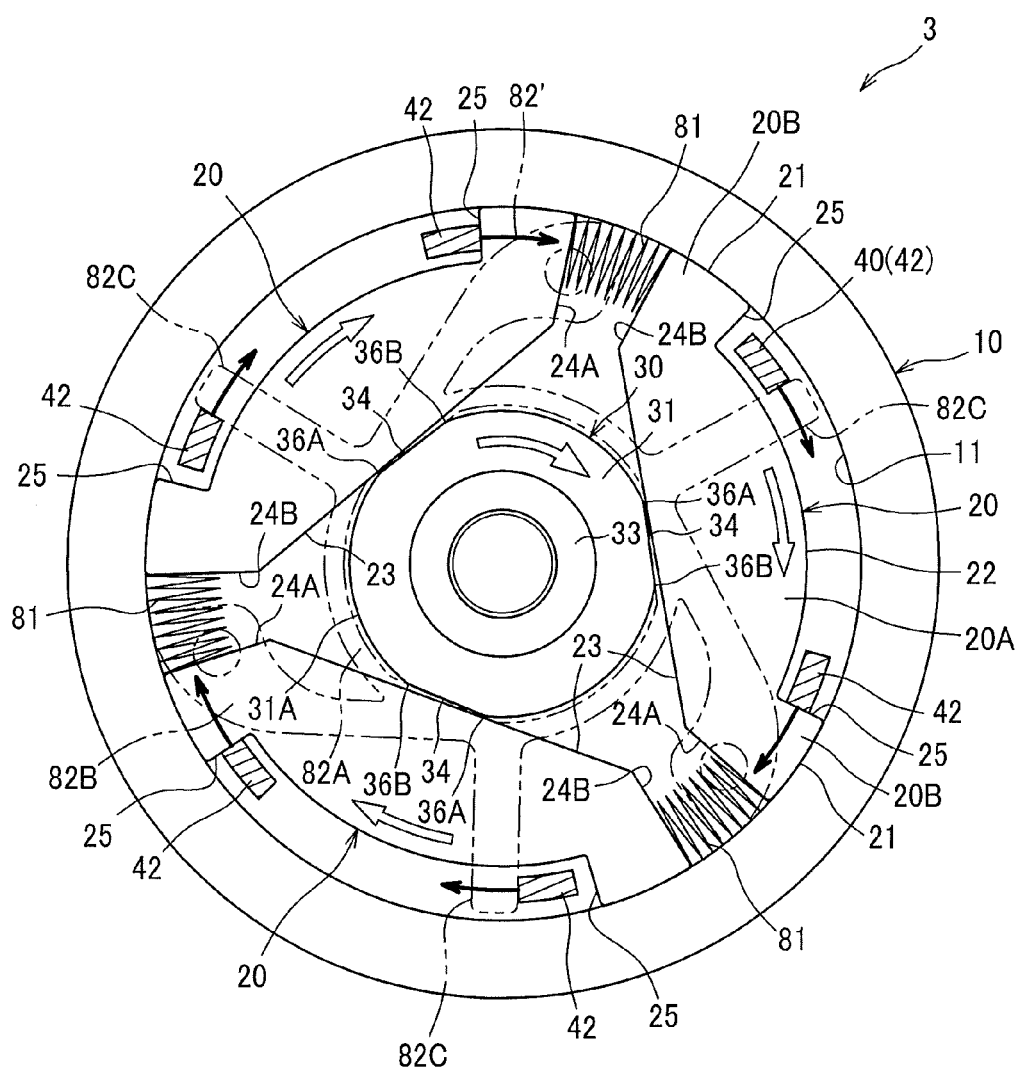
FIG. 18 is a view explaining the operation of the braking device, showing a state in which a rotating force in the clockwise direction has been imparted to the output ring.

As seen in FIG. 18, when a rotation torque (input torque) in the clockwise direction is imparted from the output ring 40 as the input-side rotating member, three engageable legs 42 push the rotating force transmission arms 82C in the clockwise direction, so that the output-side rotating member 30 engaged with the friction ring 82' rotates clockwise. Further, the other three engageable legs 42 of the output ring 40 abut on the rotating force input surfaces 25 to push the rotating force input surfaces 25, so that the brake cams 20 rotate clockwise. Accordingly, when the output ring 40 is caused to rotate clockwise, the output ring 40, the brake cams 20 and the output-side rotating member 30 rotate altogether in the clockwise direction.

In this embodiment, the rotating force is not transmitted from the brake cams 20 to the output-side rotating member 30. However, if a relatively large play is provided between each of the rotating force transmission arms 82C and the engageable leg 42, the cam surfaces 23 of the brake cams 20 abut on the first abutting portions 36B of the output-side rotating member 30 and apply a rotating force in the clockwise direction to the output-side rotating member 30.

Figure 19:
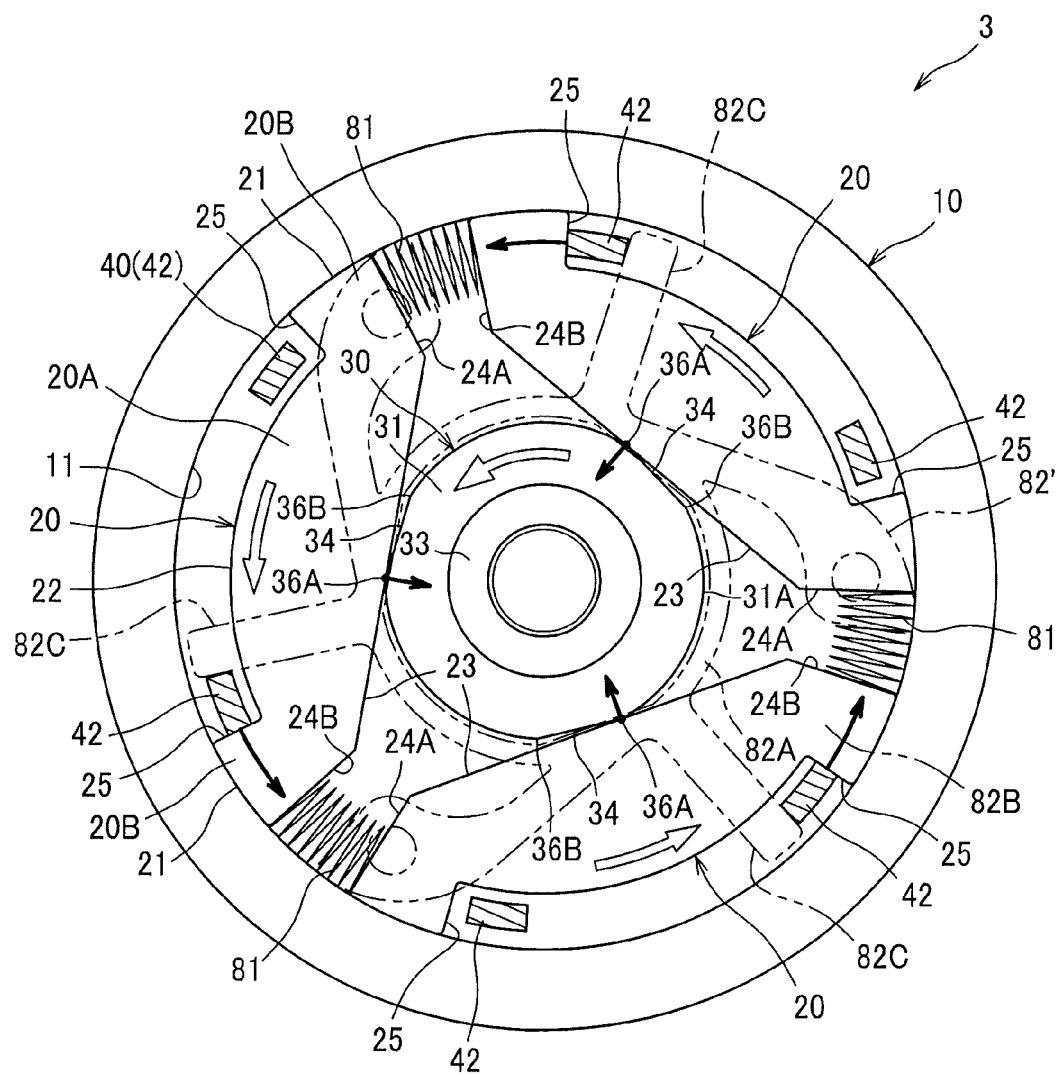
FIG. 19 is a view explaining the operation of the braking device, showing a state in which a rotating force in the counterclockwise direction has been imparted to the output ring.

As seen in FIG. 19, when a rotation torque in the counterclockwise direction is imparted from the output ring 40, three engageable legs 42 of the output ring 40 abut on the rotating force input surfaces 25 to push the rotating force input surfaces 25 and cause the brake cams 20 to rotate, and at the same time, the cam surfaces 23 of the brake cams 20 abut on the second abutting portions 36A to push the output-side rotating member 30 and cause the output-side rotating member 30 to rotate in the counterclockwise direction. Namely, the output ring 40, the brake cams 20 and the output-side rotating member 30 rotate together in the counterclockwise direction. It should be noted that during the rotation in the counterclockwise direction, the engageable legs 42 do not push the rotating force transmission arms 82C, so that the rotating force is not transmitted to the output-side rotating member 30 through the friction ring 82'.

Next, description will be given of the case in which a rotating force (reverse input torque) is imparted to the output-side rotating member 30.

Figure 20:
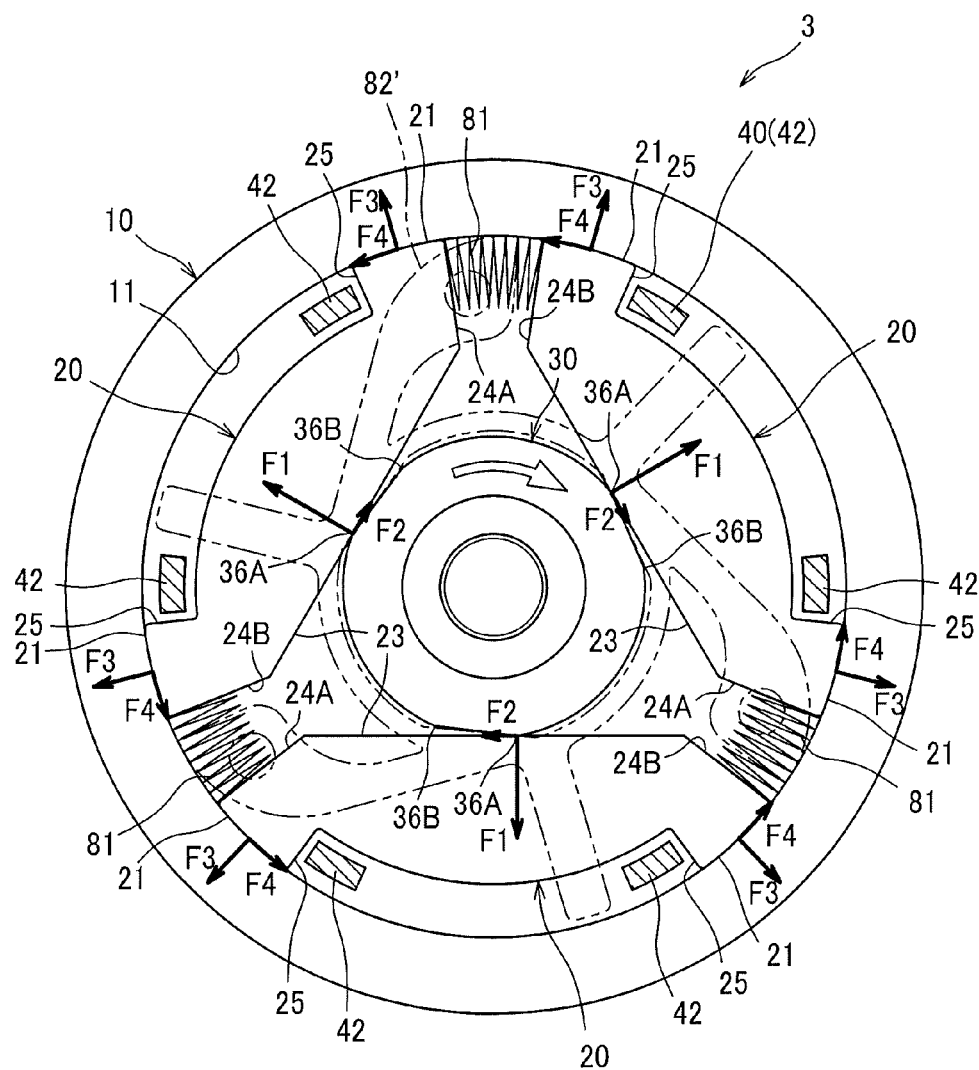
FIG. 20 is a view explaining the operation of the braking device, showing a state in which a rotating force in the clockwise direction has been imparted to the output-side rotating member.

As seen in FIG. 20, when a rotating force in the clockwise direction of the figure is applied to the output-side rotating member 30, the three second abutting portions 36A abut on the cam surfaces 23 of the corresponding brake cams 20 to push the cam surfaces 23 in the radially outward direction. Frictional forces F2 acting on the abutting points in accordance with the forces F1 for pushing the cam surfaces 23 act, through slightly, in such a manner as to rotate the brake cams 20 in the counterclockwise direction.

The forces F1 produce forces F3 by which the brake cams 20 are pressed against the inner peripheral surface 11 of the outer race 10 at the brake surfaces 21. Further, in response to the forces F3, frictional forces F4 that resist the forces tending to impart clockwise rotation to the brake cams 20 act between the inner peripheral surface 11 and the brake surfaces 21. According to the braking device 3 in this embodiment, as the forces (derived from the frictional forces F2) tending to impart clockwise rotation to the brake cams 20 does not overcome the frictional forces F4, the output-side rotating member 30, the brake cams 20 and the output ring 40 cannot rotate relative to the outer race 10. Namely, even if a rotation torque in the clockwise direction is applied to the output-side rotating member 30, the brake cams 20 cannot rotate because of the brake surfaces 21 pressed against the inner peripheral surface 11. Accordingly, the braking device 3 can generate a braking force. It should be noted that the rotating force in the clockwise direction is applied to the output-side rotating member 30 when the weight of the car seat S itself or the weight of an occupant seated on the car seat S acts to generate a force tending to cause the car seat S to be lowered.

Figure 21:
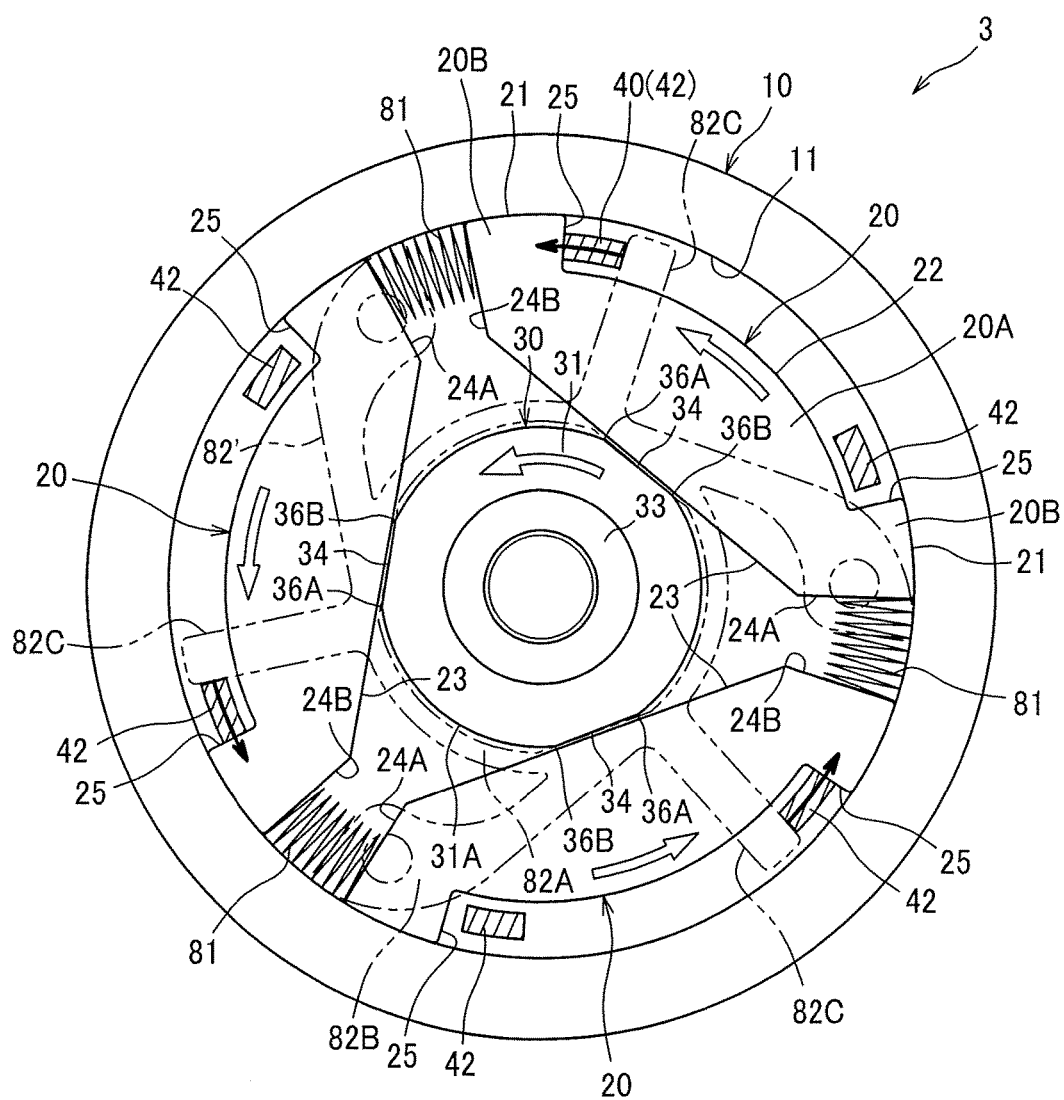
FIG. 21 is a view explaining the operation of the braking device, showing a state in which a rotating force in the counterclockwise direction has been imparted to the output-side rotating member.

As seen in FIG. 21, when a rotating force in the counterclockwise direction of the figure is applied to the output-side rotating member 30, the three rotating force transmission arms 82C of the friction ring 82' that is rotatable together with the output-side rotating member 30 push the engageable legs 42 of the output ring 40 in the counterclockwise direction and then the engageable legs 42 push the rotating force input surfaces 25 of the brake cams 20 in the counterclockwise direction. In other words, the rotating force transmission arms 82C causes the brake cams 20 to rotate through the output ring 40, whereby the output-side rotating member 30 can rotate. It should be noted that each of the rotating force transmission arms 82C and the corresponding brake cam 20 retain the engageable leg 42. Accordingly, since the rotating force transmission arms 82C contact the engageable legs 42 without play, when a rotating force in the counterclockwise direction is applied to the output ring 40, the output ring 40 starts rotating smoothly without being stuck. It should be noted that the rotating force in the counterclockwise direction is applied to the output-side rotating member 30 when a force for lifting the car seat S is applied, for example, manually without using the height adjustment mechanism.

As described above, according to the clutch unit 1 (braking device 3) in this embodiment, when the manipulation input member 50 is swung clockwise or counterclockwise from the neutral position, the output-side rotating member 30 is caused to rotate clockwise or counterclockwise. Meanwhile, when a rotating force in the clockwise direction is applied to the output-side rotating member 30, the output-side rotating member 30 does not rotate because of the braking force generated, but when a rotating force in the counterclockwise direction is applied to the output-side rotating member 30, the braking force is released and the output-side rotating member 30 rotates. Namely, the braking device 3 can be used as a one-way type bake (one-way clutch).

By this way, replacement of parts is carried out between the friction ring 82 without the rotating force transmission arms 82C and the friction ring 82' with the rotating force transmission arms 82C, so that the braking device 3 can be easily changed between two-way type brake and one-way type brake. Namely, according to the braking device 3 in this embodiment, a one-way type braking device 3 can be used as a two-way type braking device, for example, by cutting off the rotating force transmission arms 82C, omitting the friction ring 82 itself, or replacing the friction ring 82 with a washer.

According to the braking device 3 in this embodiment, since the frictional force generating member also functions as the rotating force transmission member, it is possible to reduce the number of parts.

Further, since the rotating force transmission member is formed by the ring portion 82A and the rotating force transmission arms 82C, the weight of the rotating force transmission member can be reduced to the minimum weight.

Further, since the friction ring 82 as the rotating force transmission member is formed by a plate member to have a constant thickness, the rotating force transmission member can be made compact. Further, the function of the rotating force transmission member can be disabled by cutting off unnecessary portions or by replacing the rotating force transmission member with a washer. As an alternative, if the rotating force transmission member is simply omitted, the braking device 3 can be used as a two-way type without a significant influence.

Although the second embodiment has been described above, the present invention is not limited to the above-described embodiment and various changes and modifications may be made where necessary.

For example, in the above-described embodiment, the rotating force transmission member also functions as the frictional force generating member; however, the rotating force transmission member can be modified by omitting the friction-generating arms 82B to provide the function of the rotating force transmission member only. Further, although the rotating force transmission member has been described as a part consisting of the ring portion 82A and the rotating force transmission arms 82C, the shape thereof is not limited. Further, the rotating force transmission member and the input-side rotating member (output ring 40) may be normally separated from each other in a rotational direction. In other words, play may be provided such that the rotating force transmission member and the input-side rotating member are not engaged normally but engaged with each other only when a rotating force is applied to the output-side rotating member 30.

The invention claimed is:

1. A braking device comprising:
    an outer race having a cylindrical inner peripheral surface;
    three brake cams provided radially inward of the outer race and arranged in a circumferential direction, each brake cam having a brake surface located opposite the inner peripheral surface and contactable with the inner peripheral surface and a cam surface facing radially inward and gradually changing a distance from a central axis of the inner peripheral surface; and
    an output-side rotating member disposed radially inward of the brake cams, the output-side rotating member being configured to rotate together with the brake cams when a rotating force is applied to the brake cams,
    wherein the output-side rotating member has abutting portions abuttable on the cam surfaces,
    wherein the braking device is configured such that:
        when a first rotation torque is applied to the brake cams, the cam surfaces push the abutting portions to rotate the output-side rotating member, and
        when a second rotation torque is applied to the output-side rotating member, the brake cams are not allowed to rotate in at least one rotational direction by the abutting portions pushing the cam surfaces to cause the brake surfaces to be pressed against the inner peripheral surface of the outer race, and
    wherein at least one spring member is provided between at least one pair of the brake cams among the three brake cams so as to urge the pair of the brake cams to be separated from each other.

2. The braking device according to claim 1, wherein a plurality of spring members are arranged such that one spring member is disposed between each pair of the brake cams to cause the brake cams to be separated from each other.

3. The braking device according to claim 1, wherein the three brake cams comprise a first brake cam having a first support surface configured to support one end of one spring member and a second brake cam having a second support surface configured to support another end of the one spring member,
    wherein the first support surface and the second support surface are slanted such that they are distanced from each other with increasing distance toward outside in a radial direction, and
    wherein the one spring member is in contact with the inner peripheral surface.

4. The braking device according to claim 3, wherein the spring member is a coil spring, and the coil spring is in contact with the inner peripheral surface along the length of the coil spring.

5. The braking device according to claim 1, wherein the three brake cams comprise a first brake cam having a first support surface configured to support one end of one spring member and a second brake cam having a second support surface configured to support another end of the one spring member,
    wherein the first support surface and the second support surface are slanted such that they are distanced from each other with increasing distance toward inside in a radial direction, and
    wherein the one spring member is in contact with the output-side rotating member.

6. The braking device according to claim 1, wherein each of the brake cams has a support surface configured to support one end or another end of the spring member, and wherein the spring member is disposed radially outward of a position at which an extension plane of the cam surface and the support surface intersect with each other.

7. The braking device according to claim 1, further comprising a friction generating member configured to be engaged with the output-side rotating member and pressed in contact with the inner peripheral surface,
    wherein the friction generating member is disposed to overlap the spring member as viewed from an axial direction of the output-side rotating member.

8. The braking device according to claim 1, further comprising an input-side rotating member configured to be engaged with the brake cams,
    wherein those portions of the input-side rotating member which are engaged with the brake cams are at least partly arranged in a radial range in which the spring member is disposed.

9. The braking device according to claim 1, further comprising an input-side rotating member configured to be engaged with the brake cams,
    wherein the input-side rotating member has surfaces contactable with the brake cams, which surfaces are smaller in size in a radial direction than surfaces of the spring member contactable with the brake cams.

10. The braking device according to claim 1, wherein the at least one spring member is provided between only one pair of the brake cams.

11. The braking device according to claim 1, wherein the outer race has a pair of side surfaces located radially outward of the inner peripheral surface and orthogonal to the inner peripheral surface in a direction toward the axis of the inner peripheral surface, and
    wherein the outer race is welded at one of the pair of side surfaces to a sheet-metal member configured to support the braking device.

12. The braking device according to claim 11, wherein the side surface and the sheet-metal member are laser welded to each other.

13. The braking device according to claim 1, further comprising:
    an input-side rotating member configured to be engaged with the brake cams in a rotating direction thereof; and
    a rotating force transmission member comprising an engagement portion engaged with the output-side rotating member so as to rotate together with the output-side rotating member, and transmission portions disposed to be abuttable on the input-side rotating member in a first rotating direction against the brake cams,
    wherein the abutting portions of the output-side rotating member includes:

first abutting portions abuttable on the cam surfaces when a rotating force in the first rotating direction is applied to the output-side rotating member, and second abutting portions abuttable on the cam surfaces when a rotating force in a second rotating direction is applied to the output-side rotating member, and wherein the output-side rotating member rotates when the first rotation torque is imparted from the input-side rotating member to the brake cams, whereas when the second rotation torque is imparted to the output-side rotating member, the transmission portions cause the brake cams to rotate through the input-side rotating member for the first rotation torque in the first rotating direction but for the second rotation torque in the second rotating direction, the second abutting portions push the cam surfaces to cause the brake surfaces to be pressed against the inner peripheral surface of the outer race so as to prevent the brake cams from rotating.

14. The braking device according to claim 13, wherein the rotating force transmission member is pressed in contact with the inner peripheral surface.

15. The braking device according to claim 1, wherein each of the brake cams comprises a pair of protruding portions protruding radially outward and distanced from each other in the circumferential direction, and a pair of brake surfaces respectively provided on the pair of protruding portions, and
wherein when the second rotation torque is applied to the output-side rotating member, the pair of brake surfaces are pressed in contact with the inner peripheral surface at the same time.

16. A braking device comprising:
an outer race having a cylindrical inner peripheral surface;
three brake cams provided radially inward of the outer race and arranged in a circumferential direction, each brake cam having a pair of protruding portions protruding radially outward and distanced from each other in the circumferential direction, a pair of brake surfaces respectively provided on the pair of protruding portions, and a cam surface facing radially inward and gradually changing a distance from a central axis of the inner peripheral surface, the brake surfaces being located opposite the inner peripheral surface and contactable with the inner peripheral surface; and
an output-side rotating member disposed radially inward of the brake cams,
wherein the output-side rotating member has abutting portions abuttable on the cam surfaces,
wherein the braking device is configured such that:
when a first rotation torque is applied to the brake cams, the cam surfaces push the abutting portions to rotate the output-side rotating member, and
when a second rotation torque is applied to the output-side rotating member, the brake cams are not allowed to rotate in at least one rotational direction by the abutting portions pushing the cam surfaces to cause the brake surfaces to be pressed against the inner peripheral surface of the outer race,
wherein at least one urging member is provided between at least one pair of the brake cams among the three brake cams so as to urge the pair of the brake cams to be separated from each other, and
wherein when a third rotation torque is applied to the output-side rotating member, the pair of brake surfaces are pressed in contact with the inner peripheral surface at the same time.

17. A braking device comprising:
an outer race having a cylindrical inner peripheral surface;
three brake cams provided radially inward of the outer race and arranged in a circumferential direction, each brake cam having a brake surface located opposite the inner peripheral surface and contactable with the inner peripheral surface and a cam surface facing radially inward and gradually changing a distance from a central axis of the inner peripheral surface; and
an output-side rotating member disposed radially inward of the brake cams,
wherein the output-side rotating member has abutting portions abuttable on the cam surfaces,
the braking device is configured such that:
when a first rotation torque is applied to the brake cams, the cam surfaces push the abutting portions to rotate the output-side rotating member, and
when a second rotation torque is applied to the output-side rotating member, the brake cams are not allowed to rotate in at least one rotational direction by the abutting portions pushing the cam surfaces to cause the brake surfaces to be pressed against the inner peripheral surface of the outer race, and
an urging member is provided between only one pair of the brake cams among the three brake cams so as to urge the pair of the brake cams to be separated from each other.

18. The braking device according to claim 17, wherein the urging member is a coil spring.

* * * * *